(12) United States Patent
Salehin et al.

(10) Patent No.: US 12,701,374 B2
(45) Date of Patent: *Aug. 4, 2026

(54) 3D SOUND ORIENTATION ADAPTABILITY

(71) Applicant: QUALCOMM Incorporated, San Diego, CA (US)

(72) Inventors: S M Akramus Salehin, San Diego, CA (US); Shankar Thagadur Shivappa, San Diego, CA (US); Sanghyun Chi, San Diego, CA (US); Nils Gunther Peters, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 184 days.

This patent is subject to a terminal disclaimer.

(21) Appl. No.: 18/798,550

(22) Filed: Aug. 8, 2024

(65) Prior Publication Data

US 2025/0031000 A1 Jan. 23, 2025

Related U.S. Application Data

(63) Continuation of application No. 16/743,275, filed on Jan. 15, 2020, now Pat. No. 12,120,498.

(60) Provisional application No. 62/902,665, filed on Sep. 19, 2019.

(51) Int. Cl.
| | |
|---|---|
| *H04S 3/02* | (2006.01) |
| *G11B 20/10* | (2006.01) |
| *H04S 3/00* | (2006.01) |

(52) U.S. Cl.
CPC ........ *H04S 3/006* (2013.01); *G11B 20/10527* (2013.01); *G11B 2020/10546* (2013.01); *H04S 2400/01* (2013.01)

(58) Field of Classification Search
CPC ..... H04R 1/403; H04R 1/406; H04R 2201/40
See application file for complete search history.

(56) References Cited

U.S. PATENT DOCUMENTS

| | | | | |
|---|---|---|---|---|
| 9,712,936 | B2 | 7/2017 | Peters | |
| 10,609,476 | B2* | 3/2020 | Amano | ................... H04R 3/005 |
| 2012/0128160 | A1* | 5/2012 | Kim | ....................... H04R 3/005 |
| | | | | 381/17 |
| 2013/0275873 | A1* | 10/2013 | Shaw | ..................... G01B 21/00 |
| | | | | 715/716 |
| 2021/0092543 | A1 | 3/2021 | Salehin et al. | |

* cited by examiner

*Primary Examiner* — Thomas H Maung
(74) *Attorney, Agent, or Firm* — QUALCOMM Incorporated; Espartaco Diaz Hidalgo

(57) ABSTRACT

An apparatus includes one or more processors configured to receive orientation data and to select, based on the orientation data, a particular filter from among multiple filters. The one or more processors are configured to perform signal processing operations associated with three-dimensional (3D) sound data based on the particular filter.

20 Claims, 9 Drawing Sheets

GUI
170

GUI
170

900

902

Receive, at one or more processors, orientation data

904

Select, based on the orientation data, a particular filter from among multiple filters

906

Perform signal processing operations associated with three-dimensional (3D) sound data based on the particular filter

3D SOUND ORIENTATION ADAPTABILITY

I. CROSS-REFERENCE TO RELATED APPLICATIONS

The present application claims priority from and is a continuation of pending U.S. patent application Ser. No. 16/743,275, filed Jan. 15, 2020, and entitled "3D SOUND ORIENTATION ADAPTABILITY," which claims priority from U.S. Provisional Patent Application No. 62/902,665, filed Sep. 19, 2019 and entitled "3D SOUND ORIENTA-TION ADAPTABILITY," the content of each of which is incorporated herein by reference in its entirety.

II. FIELD

The present disclosure is generally related to three-dimensional (3D) sound encoding and playback

III. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

An ambisonic signal (often represented by a plurality of spherical harmonic coefficients (SHC) or other hierarchical elements) is an example of a three-dimensional representation of a sound scene. The ambisonic signal, or SHC representation of the ambisonic signal, may represent the sound scene in a manner that is independent of local speaker geometry used to playback a multi-channel audio signal rendered from the ambisonic signal. The ambisonic signal may also facilitate backwards compatibility as the ambisonic signal may be rendered to multi-channel formats, such as a 5.1 audio channel format or a 7.1 audio channel format.

A portable electronic device having multiple microphones can be used to capture a 3D representation of a sound scene, such as in conjunction with video recording or teleconferencing, as illustrative examples. For example, a mobile phone can have multiple microphones arranged at various locations and orientations that can be used for 3D audio capture. However, due to variations in the locations, orientations, and types of microphones integrated in the mobile phone, the quality of 3D audio capture for some portions of the sound scene may be better than for other portions of the sound field. In addition, changing the orientation of the mobile phone while recording causes the sound scene to appear to rotate during playback of the 3D representation of the sound field.

IV. SUMMARY

According to a particular implementation of the techniques disclosed herein, an apparatus includes one or more processors configured to receive orientation data and to select, based on the orientation data, a particular filter from among multiple filters. The one or more processors are also configured to perform signal processing operations associated with three-dimensional (3D) sound data based on the particular filter.

According to another particular implementation of the techniques disclosed herein, a method includes receiving, at one or more processors, orientation data and selecting, based on the orientation data, a particular filter from among multiple filters. The method also includes performing signal processing operations associated with three-dimensional (3D) sound data based on the particular filter.

According to another particular implementation of the techniques disclosed herein, a non-transitory computer-read-able medium includes instructions that, when executed by one or more processors, cause the one or more processors to receive orientation data and to select, based on the orientation data, a particular filter from among multiple filters. The instructions also cause the one or more processors to perform signal processing operations associated with three-dimensional (3D) sound data based on the particular filter.

According to another particular implementation of the techniques disclosed herein, an apparatus includes means for generating orientation. The apparatus includes means for selecting, based on the orientation data, a particular filter from among multiple filters. The apparatus also includes means for performing signal processing operations associated with three-dimensional (3D) sound data based on the particular filter.

Other implementations, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
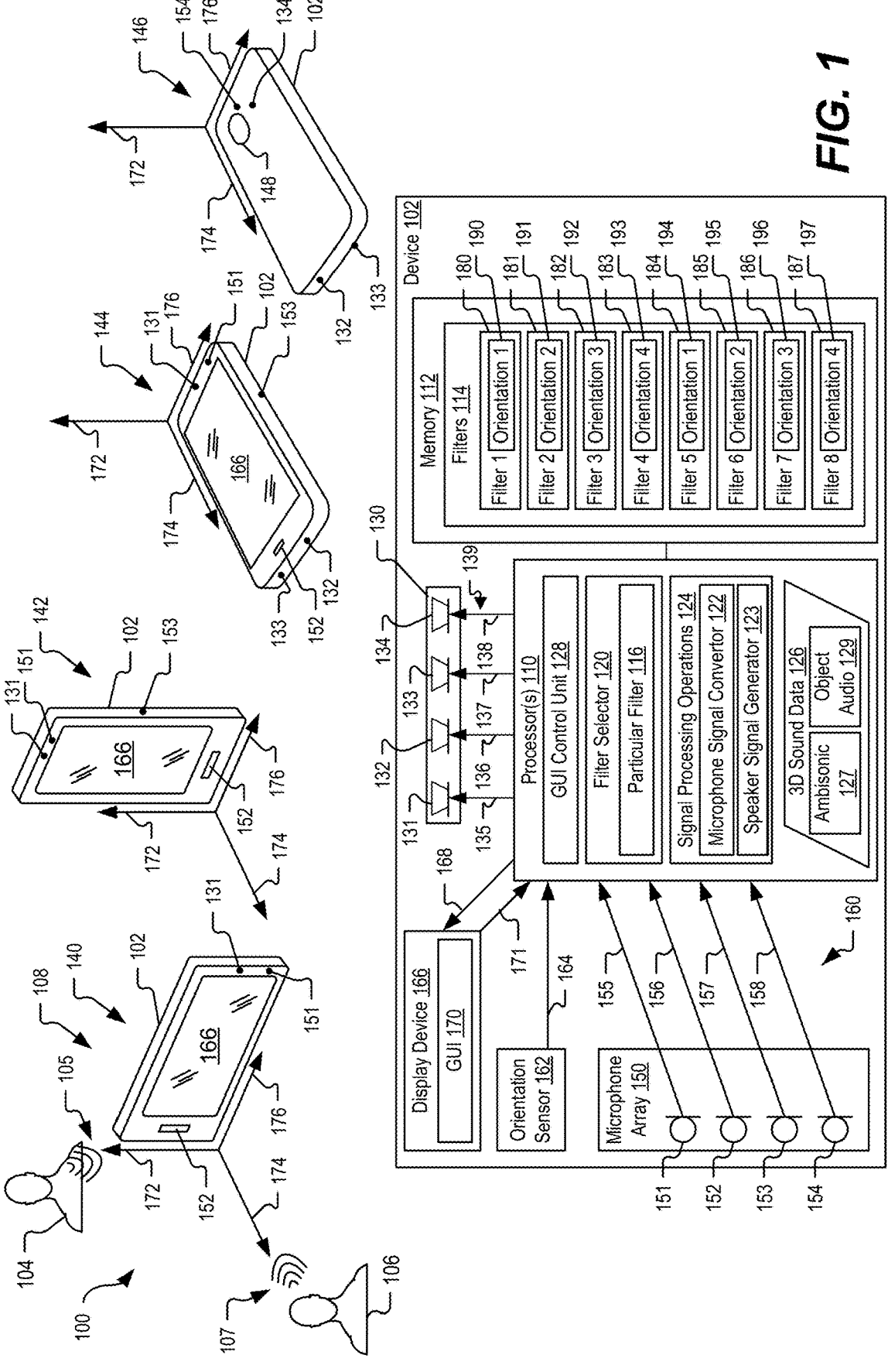
FIG. 1 is a diagram illustrating an illustrative implementation of a system that includes a device configured to perform orientation-based signal processing operations associated with 3D sound data.

Systems and methods of orientation-based 3D sound orientation adaptability are disclosed. Conventionally, multiple microphones can be used to capture a 3D audio representation of a scene for video recording, teleconferencing, or other applications. When performed at a mobile device, such as a phone, the orientation of the microphones relative to the scene can vary during audio capture. With an ideal microphone array (e.g., a tetrahedral or spherically symmetric array of identical microphones), sound capture quality may be independent of the orientation of the device, and changes in orientation of the device can be accommodated by rotating the resulting 3D sound representation with no loss of performance.

However, using the integrated microphones of a conventional mobile phone for capturing an audio scene results in varying audio quality of the resulting 3D sound scene encoding based on the orientation of the mobile device, such as due to effects that include frequency-based microphone characteristics such as directivity, diffraction, and refraction. Although rotating the resulting 3D sound scene based on the orientation of the mobile device does not take into account changes in such effects and can result in relatively poor audio performance, not adjusting the 3D sound representation based on a change in the orientation of the mobile device causes the sound scene to appear to rotate during playback of the 3D representation of the sound scene. Similarly, if the orientation of the playback device changes during playback of the 3D representation of the sound scene, failing to adjust for the change in the orientation of the playback device causes the sound scene, as perceived by a listener during playback, to be misaligned (e.g., rotated) as compared to the original sound scene.

Devices and techniques disclosed herein enable selection and use of different filters, based on the orientation of the device while capturing the sound scene, during playback of the sound scene, or both, in conjunction with a 3D audio encoding or playback operation to provide overall enhanced audio quality as compared to conventional techniques. In some implementations, selecting different filters that are used for 3D sound scene encoding for different orientations of the microphone array, such as based on whether a mobile phone is held upright, in a portrait mode, or sideways, in a landscape mode, results in rotations of the encoded sound scene to substantially match the orientation of the original sound scene. In some implementations, selecting different filters that are used during playback of the 3D sound scene for different orientations of a loudspeaker array, such as based on whether a mobile phone is held upright, in a portrait mode, or sideways, in a landscape mode, during playback results in the sound scene perceived by a listener during playback to be substantially aligned with (e.g., not rotated relative to) the original sound scene.

In some implementations, the different filters that are used for 3D sound scene encoding are tuned for different orientations of the microphone array, such as based on whether a mobile phone is held in the portrait mode or in the landscape mode during audio capture. Because higher audio quality is generally desirable for sounds received from a horizontal direction (e.g., from sound sources such as people or objects at approximately the same height of the mobile phone) than for sounds in a vertical direction (e.g., from sound sources above or below the mobile phone), one filter can be selected that is tuned to enhance sounds received from the horizontal direction when the mobile phone is in the portrait mode, and another filter can be selected that is tuned to enhance sounds received from the horizontal direction when the mobile phone is in the landscape mode. Tuning the filters for the different orientations enables audio capture to account for frequency-based directivity, diffraction, and refraction differences of the microphones during audio capture in the different orientations and rotates the sound field to accommodate for the different orientations. As a result, 3D sound scene encoding of the captured audio has enhanced resolution for sounds of interest in both the portrait mode and the landscape mode, as compared to conventional devices that can exhibit reduced quality of sound capture based on the orientation of the device.

In some implementations, additional filters are tuned for additional orientations of the microphone array during sound scene capture, the loudspeaker array during sound scene playback, or both, such as a face-up mode in which a mobile phone or tablet computing device that is positioned flat on a table or other surface, to provide proper orientation and enhanced sound quality for these additional orientations. In some implementations, filters are provided that are specifically tuned for particular directions of incoming sound for various orientations of the microphone array. A graphical user interface can be provided to enable a user to select a direction or region of interest for sound capture, and an appropriate filter is selected for use based on the selected direction of interest in addition to the orientation of the microphone array.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

The terms "apparatus" and "device" are used generically and interchangeably unless otherwise indicated by the particular context. Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The terms "method," "process," "procedure," and "technique" are used generically and interchangeably unless otherwise indicated by the particular context. The terms "element" and "module" may be used to indicate a portion of a greater configuration. The term "packet" may correspond to a unit of data that includes a header portion and a payload portion. Any incorporation by reference of a portion of a document shall also be understood to incorporate definitions of terms or variables that are referenced within the portion, where such definitions appear elsewhere in the document, as well as any figures referenced in the incorporated portion.

As used herein, the term "communication device" refers to an electronic device that may be used for voice and/or data communication over a wireless communication network. Examples of communication devices include smart speakers, speaker bars, cellular phones, personal digital assistants (PDAs), handheld devices, headsets, wearable devices, wireless modems, laptop computers, personal computers, etc.

In the present disclosure, terms such as "determining", "calculating", "estimating", "shifting", "adjusting", etc. may be used to describe how one or more operations are performed. It should be noted that such terms are not to be construed as limiting and other techniques may be utilized to perform similar operations. Additionally, as referred to herein, "generating", "calculating", "estimating", "using", "selecting", "accessing", and "determining" may be used interchangeably. For example, "generating", "calculating", "estimating", or "determining" a parameter (or a signal) may refer to actively generating, estimating, calculating, or determining the parameter (or the signal) or may refer to using, selecting, or accessing the parameter (or signal) that is already generated, such as by another component or device.

In general, techniques are described for coding of 3D sound data, such as ambisonics audio data. Ambisonics audio data may include different orders of ambisonic coefficients (e.g., first order or second order and more (which may be referred to as higher-order ambisonic (HOA) coefficient corresponding to a spherical harmonic basis function having an order greater than one). Ambisonics data may also include mixed order ambisonics (MOA). Thus, ambisonics audio data may include at least one ambisonic coefficient corresponding to a harmonic basis function.

The evolution of surround sound has made available many audio output formats for entertainment. Examples of such consumer surround sound formats are mostly 'channel' based in that they implicitly specify feeds to loudspeakers in certain geometrical coordinates. The consumer surround sound formats include the popular 5.1 format (which includes the following six channels: front left (FL), front right (FR), center or front center, back left or surround left, back right or surround right, and low frequency effects (LFE)), the growing 7.1 format, and various formats that includes height speakers such as the 7.1.4 format and the 22.2 format (e.g., for use with the Ultra High Definition Television standard). Non-consumer formats can span any number of speakers (in symmetric and non-symmetric geometries) often termed 'surround arrays'. One example of such a sound array includes 32 loudspeakers positioned at coordinates on the corners of a truncated icosahedron.

The input to a future Moving Picture Experts Group (MPEG) encoder is optionally one of three possible formats: (i) traditional channel-based audio (as discussed above), which is meant to be played through loudspeakers at pre-specified positions; (ii) object-based audio, which involves discrete pulse-code-modulation (PCM) data for single audio objects with associated metadata containing their location coordinates (amongst other information); or (iii) scene-based audio, which involves representing the sound field using coefficients of spherical harmonic basis functions (also called "spherical harmonic coefficients" or SHC, "ambisonic audio data," and "ambisonic coefficients"). The future MPEG encoder may be described in more detail in a document entitled "Call for Proposals for 3D Audio," by the International Organization for Standardization/International Electrotechnical Commission (ISO)/(IEC) JTC1/SC29/WG11/N13411, released January 2013 in Geneva, Switzerland, and available at http://mpeg.chiariglione.org/sites/default/files/files/standards/parts/docs/w13411.zip.

There are various 'surround-sound' channel-based formats currently available. The formats range, for example, from the 5.1 home theatre system (which has been the most successful in terms of making inroads into living rooms beyond stereo) to the 22.2 system developed by NHK (Nippon Hoso Kyokai or Japan Broadcasting Corporation). Content creators (e.g., Hollywood studios) would like to produce a soundtrack for a movie once, and not spend effort to remix it for each speaker configuration. Recently, Standards Developing Organizations have been considering ways in which to provide an encoding into a standardized bitstream and a subsequent decoding that is adaptable and agnostic to the speaker geometry (and number) and acoustic conditions at the location of the playback (involving a renderer).

To provide such flexibility for content creators, a hierarchical set of elements may be used to represent a sound field. The hierarchical set of elements may refer to a set of elements in which the elements are ordered such that a basic set of lower-ordered elements provides a full representation of the modeled sound field. As the set is extended to include higher-order elements, the representation becomes more detailed, increasing resolution.

One example of a hierarchical set of elements is a set of spherical harmonic coefficients (SHC). The following expression demonstrates a description or representation of a sound field using SHC:

$$p_i(t, r_r, \theta_r, \varphi_r) = \sum_{\omega=0}^{\infty} \left[ 4\pi \sum_{n=0}^{\infty} j_n(kr_r) \sum_{m=-n}^{n} A_n^m(k) Y_n^m(\theta_r, \varphi_r) \right] e^{j\omega t},$$

The expression shows that the pressure $p_i$ at any point $\{r_r, \theta_r, \varphi_r\}$ of the sound field, at time t, can be represented uniquely by the SHC, $$A_n^m(k).$$

Here, $$k = \frac{\omega}{c},$$

c is the speed of sound (~343 m/s), $\{r_r,\theta_r,\varphi_r\}$ is a point of reference (or observation point), $j_n(\cdot)$ is the spherical Bessel function of order n, and $$Y_n^m(\theta_r, \varphi_r)$$

are the spherical harmonic basis functions of order n and suborder m. It can be recognized that the term in square brackets is a frequency-domain representation of the signal (i.e., $S(\omega,r_r,\theta_r,\varphi_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

For each order spherical harmonic basis functions, e.g., a zero order (n=0), a first order (n=1), a second order (n=2), a third order (n=3), and a fourth order (n=4), etc., there is an expansion of suborders m. A number of spherical harmonic basis functions for a particular order may be determined as: # basis functions=$(n_+1)^2$. For example, a tenth order (n=10) would correspond to 122 spherical harmonic basis functions (e.g., $(10+1)^2$).

The SHC $$A_n^m(k)$$

can either be physically acquired (e.g., recorded) by various microphone array configurations or, alternatively, they can be derived from channel-based or object-based descriptions of the sound field. The SHC represent scene-based audio, where the SHC may be input to an audio encoder to obtain encoded SHC that may promote more efficient transmission or storage. For example, a fourth-order representation involving $(1+4)^2$ (25, and hence fourth order) coefficients may be used.

As noted above, the SHC may be derived from a microphone recording using a microphone array. Various examples of how SHC may be derived from microphone arrays are described in Poletti, M., "Three-Dimensional Surround Sound Systems Based on Spherical Harmonics," J. Audio Eng. Soc., Vol. 53, No. 11, 2005 November, pp. 1004-1025.

To illustrate how the SHCs may be derived from an object-based description, consider the following equation. The coefficients $$A_n^m(k)$$

for the sound field corresponding to an individual audio object may be expressed as:

$$A_n^m(k) = g(\omega)(-4\pi i k)h_n^{(2)}(kr_s)Y_n^{m^*}(\theta_s, \varphi_s),$$

where i is $$\sqrt{-1}, h_n^{(2)}(\cdot)$$

is the spherical Hankel function (of the second kind) of order n, and $\{r_s,\theta_s,\varphi_s\}$ is the location of the object. Knowing the object source energy $g(\omega)$ as a function of frequency (e.g., using time-frequency analysis techniques, such as performing a fast Fourier transform on the PCM stream) enables conversion of each PCM object and the corresponding location into the SHC $$A_n^m(k).$$

Further, it can be shown (since the above is a linear and orthogonal decomposition) that the $$A_n^m(k)$$

coefficients for each object are additive. In this manner, a multitude of PCM objects can be represented by the $$A_n^m(k)$$

coefficients (e.g., as a sum of the coefficient vectors for the individual objects). Essentially, the coefficients contain information about the sound field (the pressure as a function of 3D coordinates), and the above represents the transformation from individual objects to a representation of the overall sound field, in the vicinity of the observation point $\{r_r,\theta_r,\varphi_r\}$.

FIG. 1 depicts system 100 including a device 102 configured to perform orientation-based signal processing operations associated with 3D sound data 126. For example, the device 102 is configured to generate 3D sound data 126 corresponding to a sound scene 108 based on an orientation of a microphone array 150 of the device 102, to adapt 3D sound data 126 corresponding to the sound scene 108 based on an orientation of an loudspeaker array 130 of the device 102 during playback or both. Although the device 102 is depicted as mobile phone, in other implementations the device 102 corresponds to a tablet computer, a robot, a virtual reality headset, a wearable device, or a vehicle, as non-limiting examples.

The device 102 includes one or more processors 110 that are coupled to a memory 112, one or more orientation sensors (referred to as "orientation sensor") 162, a display device 166 (e.g., a screen) coupled to the one or more processors 110 and configured to display a graphical user interface (GUI) 170, the loudspeaker array 130, and the microphone array 150. The microphone array 150 includes a microphone 151, a microphone 152, a microphone 153, and a microphone 154. According to one implementation, at least one microphone 151, 152, 153, 154 is an omnidirectional microphone. For example, at least one microphone 151, 152, 153, 154 is configured to capture sound with approximately equal gain for all sides and directions. According to one implementation, at least one microphone 151, 152, 153, 154 is a directional microphone. For example, at least one microphone 151, 152, 153, 154 is configured to capture sound from sources within a relatively narrow range of directions. According to one implementation, at least one of the microphones 151, 152, 153, 154 is a microelectromechanical system (MEMS) microphone.

The microphones 151-154 are positioned at various locations around the device 102. As illustrated, the first microphone 151 and the second microphone 152 are located at opposing ends of the device 102. For example, when the device 102 is positioned by a user for a telephone call, the first microphone 151 is at or near the top of the device 102 (e.g., near a forward-facing camera of the device 102, in the proximity of the user's ear) and the second microphone 152 is at or near the bottom of the device 102 (e.g., in the proximity of the user's mouth, to function as a primary speech-capturing microphone). The third microphone 153 is located at or near a side edge of the device 102, and the fourth microphone 154 is located on a back face of the device 102 (e.g., near a rear-facing camera 148, to function as a primary audio-capturing microphone during video capture using the rear-facing camera). The number of microphones and the locations of the microphones are depicted for illustrative purposes only, and in other implementations any number of microphones, at any locations, may be implemented in the device 102.

The loudspeaker array 130 (also referred to as "array of loudspeakers 130" or "speaker array 130") includes a loudspeaker 131, a loudspeaker 132, a loudspeaker 133, and a loudspeaker 134. The loudspeakers 131-134 may correspond to audio playback transducers that are positioned at various locations around the device 102. As illustrated, the loudspeaker 131 is located at one end of the device 102 and the loudspeakers 132, 133 are located at an opposite end of the device 102. For example, when the device 102 is positioned by a user for a telephone call, the loudspeaker 131 is at or near the top of the device 102 (e.g., in the proximity of the user's ear) and the loudspeakers 132, 133 are at or near the bottom of the device 102. The loudspeaker 134 is located on a back face of the device 102 (e.g., near the rear-facing camera 148). The number of loudspeakers and the locations of the loudspeakers are depicted for illustrative purposes only, and in other implementations any number of loudspeakers, at any locations, may be implemented in the device 102.

The memory 112 is configured to store multiple filters 114. Each of the multiple filters 114 corresponds to data that is available to be used during generation of the 3D sound data 126 or during playback of the 3D sound data 126 as described further below. The multiple filters 114 include filters used during audio scene capture and encoding to generate the 3D sound data 126, including a first filter 180 associated with (e.g., corresponding to) a first orientation 190 of the microphone array 150, a second filter 181 associated with a second orientation 191 of the microphone array 150, a third filter 182 associated with a third orientation 192 of the microphone array 150, and a fourth filter 183 associated with a fourth orientation 193 of the microphone array 150. The multiple filters 114 also include filters used during audio scene decoding and playback of the 3D sound data 126, including a fifth filter 184 associated with a first orientation 194 of the loudspeaker array 130, a sixth filter 185 associated with a second orientation 195 of the loudspeaker array 130, a seventh filter 186 associated with a third orientation 196 of the loudspeaker array 130, and an eighth filter 187 associated with a fourth orientation 197 of the loudspeaker array 130.

The individual filters 180-183 used during generation of the 3D sound data 126 can be generated based on calibration data that is captured during calibration of the device 102, such as by positioning the device 102 in various orientations within a predetermined sound scene to determine performance of the individual microphones 151-154 for each orientation of the device 102. Thus, one or more of the filters 114 can be tuned to take into account effects such as frequency-based directivity, diffraction and refraction experienced by the microphones 151-154 in the various orientations. In some implementations, each of the filters 180, 181, 182, and 183 includes respective filter values to be applied to each received microphone input signal 155, 156, 157, 158, mixing matrix data for use in generating the 3D sound data 126, one or more other orientation-specific parameters or values corresponding to encoding the 3D sound scene 108, or any combination thereof.

The individual filters 184-187 used during playback of the 3D sound data 126 can be generated based on calibration data that is captured during calibration of the device 102, such as by positioning the device 102 in various orientations during playback to determine overall performance of the individual loudspeakers 131-134 in re-creating the sound scene for each orientation of the device 102. Thus, one or more of the filters 114 can be tuned to take into account effects arising from the various orientations. In some implementations, each of the filters 184, 185, 186, and 187 includes respective filter values to be applied to generate audio output signals 135, 136, 137, 138, mixing matrix data for use in generating the audio output signals 135-138 based on the 3D sound data 126, one or more other orientation-specific parameters or values corresponding to playback of the 3D sound data 126 to re-create the 3D sound scene 108, or any combination thereof.

Each of the orientations 190, 191, 192, and 193 corresponds to a mode of the device 102, illustrated as a landscape mode 140, a portrait mode 142, a face-up mode 144, and a face-down mode 146, respectively. Orientations of the microphone array 150 (e.g., orientations of the device 102) are depicted with reference to a coordinate axis that depicts a vertical direction 172, a first horizontal direction 174, and a second horizontal direction 176 that is perpendicular to the first horizontal direction 174. As used herein, "horizontal" refers to any direction that is substantially parallel to the surface of the Earth (or another reference that is independent of the orientation of the device 102, such as a floor of a spacecraft in which the device 102 is used), and "vertical" refers to an up or down direction relative to the surface of the Earth (or relative to the other reference, such as the spacecraft floor). The sound scene 108 may include sound from multiple sources, such as speech 107 from a first person 106 in the first horizontal direction 174, and speech 105 from a second person 104 in the vertical direction 172.

Each of the orientations 194, 195, 196, and 197 also corresponds to a mode of the device 102. As illustrated, the orientations 194, 195, 196, and 197 correspond to the landscape mode 140, the portrait mode 142, the face-up mode 144, and the face-down mode 146, respectively, and therefore correspond to the orientations 190, 191, 192, and 193, respectively. However, in other implementations, one or more of the orientations 194-197 used during playback does not correspond to a respective one or more of the orientations 190-193 used during sound scene capture.

In the landscape mode 140, the device 102 is oriented with a long axis extending along the second horizontal direction 176, a short axis extending along the vertical direction 172, and the display device 166 facing in the first horizontal direction 174. In the portrait mode 142, the device 102 is oriented with the long axis extending along the vertical direction 172, the short axis extending along the second horizontal direction 176, and the display device 166 facing in the first horizontal direction 174. In the face-up mode 144, the device 102 is oriented with the long axis extending along the first horizontal direction 174, the short axis extending along the second horizontal direction 176, and the display device 166 facing upward in the vertical direction 172. In the face-down mode 146, the device 102 is oriented with the long axis extending along the first horizontal direction 174, the short axis extending along the second horizontal direction 176, and the display device 166 facing downward in the vertical direction 172.

The one or more processors 110 are configured to receive orientation data 164 from the orientation sensor 162. The orientation data 164 indicates an orientation of the microphone array 150, an orientation of the speaker array 130, an orientation of the device 102, or any combination thereof. In the example depicted in FIG. 1, the orientation of the microphone array 150 and the orientation of the loudspeaker array 130 are constrained to correspond to the orientation of the device 102. In a particular implementation, the orientation sensor 162 includes a compass, an accelerometer, a gyroscope, a gravity detector, a wireless signal triangulation unit, one or more other sensors configured to generate data indicative of a location or orientation of the device 102 (or of the microphone array 150 or the loudspeaker array 130), or any combination thereof.

The one or more processors 110 include a filter selector 120 and a graphical user interface (GUI) control unit 128 and are configured to perform signal processing operations 124, including a microphone signal convertor 122 and a speaker signal generator 123. For example, at least a portion of one or more of the filter selector 120, the microphone signal convertor 122, the speaker signal generator 123, or the GUI control unit 128 may be implemented via execution, at the one or more processors 110, of computer-readable instructions (e.g., stored at the memory 112 or other storage, such as read-only memory (ROM), of the device 102). Alternatively, or in addition, at least a portion of one or more of the filter selector 120, the microphone signal convertor 122, the speaker signal generator 123, or the GUI control unit 128 may be implemented via dedicated hardware (e.g., circuitry) integrated into the one or more processors 110.

The one or more processors 110, via operation of the filter selector 120, are configured to select, based on the orientation data 164, a particular filter 116 from among the multiple filters 114. For example, during capture of the 3D sound scene 108, the first filter 180 may be selected when the device 102 is in the landscape mode 140, the second filter 181 may be selected when the device 102 is in the portrait mode 142, the third filter 182 may be selected when the device 102 is in the face-up mode 144, and the fourth filter 183 may be selected when the device 102 is in the face-down mode 146. Selecting the particular filter 116 based on the orientation data 164 enables the one or more processors 110 to generate the 3D sound data 126 based on the orientation of the device 102. For example, the particular filter 116 may compensate for an orientation of the device 102 so that sound captured by the microphone 152 is encoded as sound in a horizontal direction in the landscape mode 140 and the portrait mode 142 or as sound in a vertical direction in the face-up mode 144 or the face-down mode 146. To illustrate, in a particular implementation, the first filter 180 is configured to apply, in the 3D sound data 126, a first rotation corresponding to the first orientation 190, the second filter 181 is configured to apply, in the 3D sound data 126, a second rotation corresponding to the second orientation 191, the third filter 182 is configured to apply, in the 3D sound data 126, a third rotation corresponding to the third orientation 192, and the fourth filter 183 is configured to apply, in the 3D sound data 126, a fourth rotation corresponding to the fourth orientation 193.

In some implementations, in addition to compensating for an orientation of the device 102, the filters 180-183 may also be tuned to provide higher audio resolution in one or more directions as compared to other directions. To illustrate, the first filter 180 may be configured to provide higher resolution of the 3D sound scene 108 in a horizontal direction 174, 176 than in a vertical direction 172 when the microphone array 150 has the first orientation 190 (e.g., the device 102 is in the landscape mode 140). The second filter 181 may be configured to provide higher resolution of the 3D sound scene 108 in the horizontal direction 174, 176 than in the vertical direction 172 when the microphone array 150 has the second orientation 191 (e.g., the device 102 is in the portrait mode 142). The third filter 182 may be configured to provide higher resolution of the 3D sound scene 108 in the horizontal direction 174, 176 than in the vertical direction 172 when the microphone array 150 has the third orientation 192 (e.g., the device 102 is in the face-up mode 144). The fourth filter 183 may be configured to provide higher resolution of the 3D sound scene 108 in the horizontal direction 174, 176 than in the vertical direction 172 when the microphone array 150 has the fourth orientation 193 (e.g., the device 102 is in the face-down mode 146).

In some implementations, during audio capture, the filter selector 120 is configured to select the particular filter 116 in response to determining that the orientation data 164 corresponds to an orientation (e.g., of the microphone array 150) that more closely matches a particular orientation associated with the particular filter 116 than any other orientation associated with the other "audio capture" filters 180-183 of the multiple filters 114. In implementations in which the microphones 151-154 are at fixed locations and orientations with respect to the body of the device 102, determining the orientation of the microphone array 150 is substantially equivalent to determining the orientation of the device 102. In such implementations, the orientation data 164 may correspond to orientation data that is generated for one or more other functions of the device 102 (e.g., to adjust an orientation of graphical or video content output to the display device 166). In other implementations in which one or more of the microphones 151-154 have an adjustable location, orientation, or both, relative to the body of the device 102, the filter selector 120 may process the orientation data 164 to determine an orientation of the microphone array 150 relative to, or independently of, an orientation of the device 102.

The filter selector 120 may further be configured, during playback of the 3D sound data 126, to select the fifth filter 184 when the device 102 is in the landscape mode 140, the sixth filter 185 when the device 102 is in the portrait mode 142, the seventh filter 186 when the device 102 is in the face-up mode 144, and the eighth filter 187 when the device 102 is in the face-down mode 146. Selecting the particular filter 116 based on the orientation data 164 enables the one or more processors 110 to convert the 3D sound data 126 to audio output signals 135-138 to re-create the 3D sound scene 108 based on the orientation of the device 102. For example, the particular filter 116 may compensate for an orientation of the device 102 so that the first loudspeaker 131 primarily plays out sound represented in the 3D sound data 126 as being in a horizontal direction when the device 102 is in the landscape mode 140 and the portrait mode 142 and primarily plays out sound represented in the 3D sound data 126 as being in a vertical direction when the device 102 is in the face-up mode 144 or the face-down mode 146. To illustrate, in a particular implementation, the fifth filter 184 is configured to apply, to the 3D sound data 126, a first rotation corresponding to the first orientation 194, the sixth filter 185 is configured to apply, to the 3D sound data 126, a second rotation corresponding to the second orientation 195, the seventh filter 186 is configured to apply, to the 3D sound data 126, a third rotation corresponding to the third orientation 196, and the eighth filter 187 is configured to apply, in the 3D sound data 126, a fourth rotation corresponding to the fourth orientation 197. In some implementations, in addition to compensating for an orientation of the device 102 during playback, the filters 184-187 may also be tuned to provide higher sound resolution in one or more directions as compared to other directions.

In some implementations, during audio playback, the filter selector 120 is configured to select the particular filter 116 in response to determining that the orientation data 164 corresponds to orientation (e.g., of the loudspeaker array 130) that more closely matches a particular orientation associated with the particular filter 116 than any other orientation associated with the other "playback" filters 184-187 the multiple filters 114. In implementations in which the loudspeakers 131-134 are at fixed locations and orientations with respect to the body of the device 102, determining the orientation of the loudspeaker array 130 is substantially equivalent to determining the orientation of the device 102. In such implementations, the orientation data 164 may correspond to orientation data that is generated for one or more other functions of the device 102 (e.g., to adjust an orientation of graphical or video content output to the display device 166). In other implementations in which one or more of the loudspeakers 131-134 have an adjustable location, orientation, or both, relative to the body of the device 102, the filter selector 120 may process the orientation data 164 to determine an orientation of the loudspeaker array 130 relative to, or independently of, an orientation of the device 102.

In some implementations, rather than selecting the particular filter 116 as the filter associated with an orientation that most closely matches the orientation indicated by the orientation data 164, multiple filters are instead selected. For example, during audio capture, multiple filters may be selected in response to the orientation not matching any of the orientations 190, 191, 192, or 193 associated with the filters 180, 181, 182, or 183, respectively, within a first threshold matching amount. As another example, during audio playback, multiple filters may be selected in response to the orientation not matching any of the orientations 194, 195, 196, or 197 associated with the filters 184, 185, 186, or 187, respectively, within a second threshold matching amount (which may or may not match the first threshold matching amount). In such implementations, the filter selector 120 selects the particular filter 116 and also selects a second particular filter based on the orientation data 164, such as by selecting the two filters associated with the two orientations 190, 191, 192, or 193 that most closely match the orientation of the microphone array 150 during audio capture, or by selecting the two filters associated with the two orientations 194, 195, 196, or 197 that most closely match the orientation of the loudspeaker array 130 during audio playback.

The one or more processors 110 are configured to perform a portion of the signal processing operations 124 corresponding to operation of the microphone signal convertor 122 on audio input signals 160 captured by the microphones 151-154 of the microphone array 150 to generate the three-dimensional (3D) sound data 126 based on the audio input signals 160 and further based on the particular filter 116. For example, the signal processing operations 124 can include processing a first signal 155 from the first microphone 151, a second signal 156 from the second microphone 152, a third signal 157 from the third microphone 153, and a fourth signal 158 from the fourth microphone 154. In some implementations, the signal processing operations 124 include filtering the individual signals 155-158 using filter values of the particular filter 116 and applying a mixing matrix using mixing matrix values of the particular filter 116 to generate the 3D sound data 126. The 3D sound data 126 includes ambisonic data 127, such as first-order ambisonic data, object audio data 129, or both, as non-limiting examples. In an implementation in which the object audio data 129 is being generated, the particular filter 116 is applied to rotate object metadata, e.g., to adjust location data indicative of positions of audio objects.

The one or more processors 110 are configured to perform a portion of the signal processing operations 124 corresponding to operation of the speaker signal generator 123 to generate audio output signals 139 for playout at the loudspeaker array 130 to substantially re-create the 3D sound scene 108 based on the 3D sound data 126 and further based on the particular filter 116. For example, the signal processing operations 124 can include generating a first signal 135 for the first loudspeaker 131, a second signal 136 for the second loudspeaker 132, a third signal 137 for the third loudspeaker 133, and a fourth signal 138 for the fourth loudspeaker 134. In some implementations, the signal processing operations 124 including applying a mixing matrix, using mixing matrix values of the particular filter 116, to the 3D sound data 126 to generate output signals and filtering the output signals using filter values of the particular filter 116 to generate the signals 135-138. In an implementation in which the object audio data 129 is being converted into the audio output signals 139, the particular filter 116 is applied to rotate object metadata, e.g., to adjust location data indicative of positions of audio objects.

In implementations in which the filter selector 120 selects multiple filters (the particular filter 116 and a second particular filter) based on the orientation data 164, the signal processing operations 124 are performed based on an interpolation between the particular filter 116 and the second particular filter or based on a combination of the particular filter 116 and the second particular filter, such as by using a weighted sum or average of filter values of the particular filter 116 and the second particular filter.

Figure 2A:
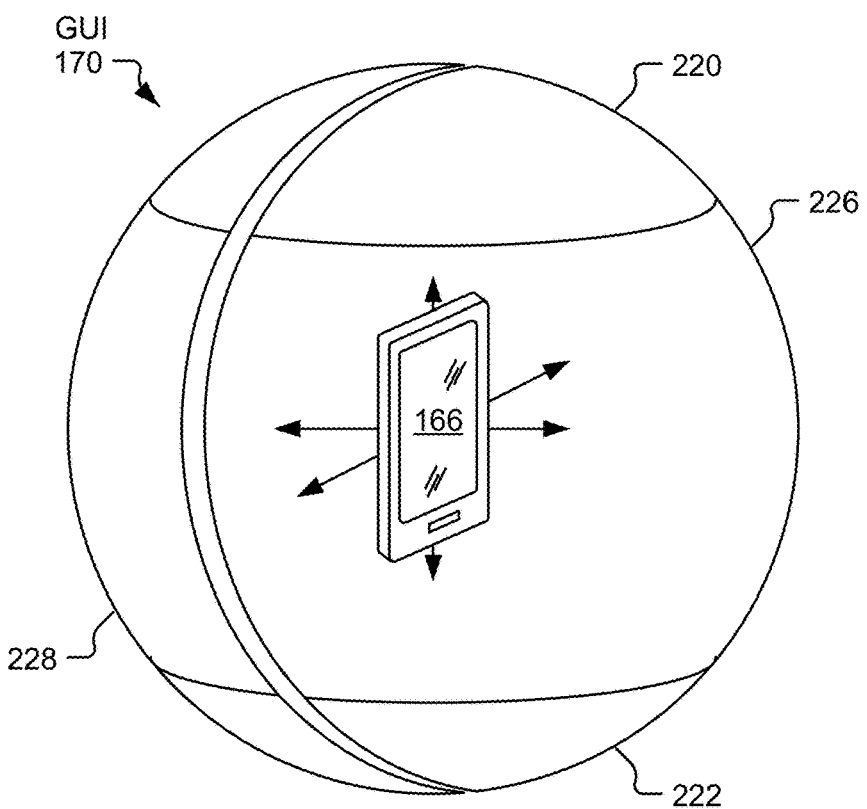
FIG. 2A illustrates an example of a graphical user interface that can be used by the device of FIG. 1.
Figure 2B:
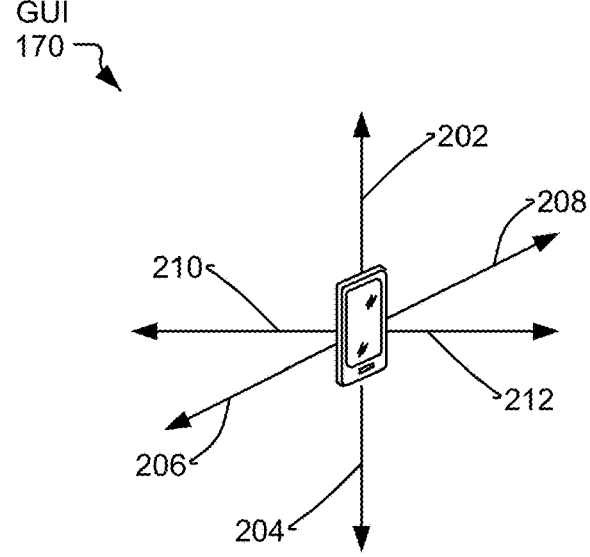
FIG. 2B illustrates another example of a graphical user interface that can be used by the device of FIG. 1.
Figure 2C:
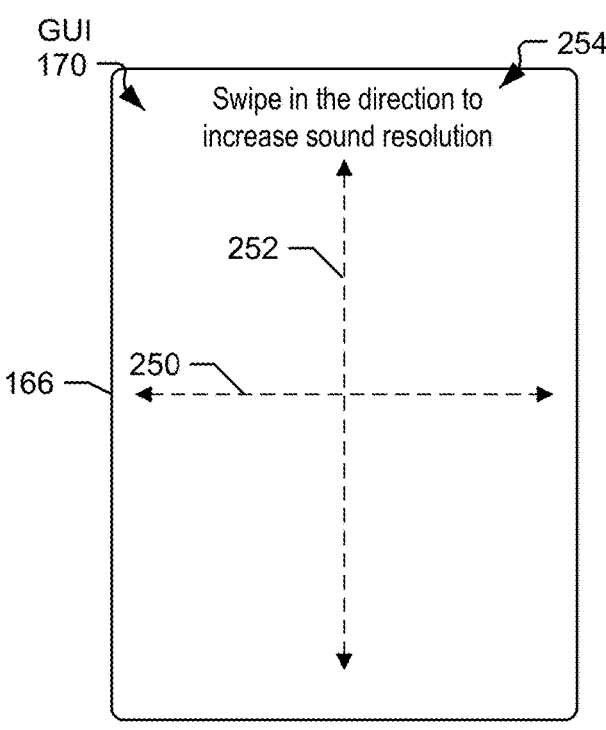
FIG. 2C illustrates another example of a graphical user interface that can be used by the device of FIG. 1.

In some implementations, the one or more processors 110 are configured, via operation of the GUI control unit 128, to generate GUI data 168 corresponding to the GUI 170 that enables user selection of one or more sound field directions, such as described further with reference to FIGS. 2A-2C. For example, the GUI 170 can enable a user of the device 102 to input a user selection 171 that indicates the user's preference of which direction(s) are to be encoded or to be played back to have higher audio resolution (e.g., to provide higher-quality representations of sounds of the sound scene 108 in the horizontal directions 174, 176 as opposed to in the vertical direction 172). In such implementations, the filter selector 120 is configured select the particular filter 116 based on orientation and further based on the user selection 171.

Because the device 102 selects filters for use with 3D sound scene encoding and playback that compensate for different orientations of the device 102 during both capture of the 3D sound scene and playback to re-create the 3D sound scene, and that may also be are specifically tuned for enhanced sound quality for various orientations of the device 102, overall user experience is improved.

Although the microphone array 150 is shown to include four microphones, in other implementations, the micro- phone array 150 may include additional microphones or fewer microphones. For example, the microphone array 150 may include three microphones, eight microphones, or any other number of microphones. Although the loudspeaker array 130 is shown to include four loudspeakers, in other implementations, the loudspeaker array 130 may include additional loudspeakers or fewer loudspeakers. For example, the loudspeaker array 130 may include three loudspeakers, eight loudspeakers, or any other number of loudspeakers.

Although the 3D sound data 126 is illustrated as including ambisonic data 127 and object audio data 129, such as to provide enhanced compatibility with other audio capture device or playback devices, in other implementations the 3D sound data 126 does not include both of the ambisonic data 127 and the object audio data 129. For example, in some implementations the 3D sound data 126 includes the ambi- sonic data 127 and omits the object audio data 129. In other implementations the 3D sound data 126 includes object audio data 129 and omits the ambisonic data 127. In some implementations, the 3D sound data 126 includes data corresponding to one or more other 3D sound encoding techniques and omits the ambisonic data 127, the object audio data 129, or both.

Although the device 102 is illustrated as including the display device 166, the microphone array 150, the loud- speaker array 130, and the orientation sensor 162, in other implementations one or more of the display device 166, the microphone array 150, the loudspeaker array 130, and the orientation sensor 162 can be omitted. For example, in some implementations the device 102 omits the orientation sensor 162 and instead receives the orientation data 164 from an external device, such as an external image sensor in a home automation system that is configured to track a position and orientation of the device 102. As another example, in some implementations the device 102 omits the display device 166. To illustrate, the device 102 may not support user customization of the sound field generation via the GUI 170, or may wirelessly transmit the GUI data 168 to another device (e.g., a networked computer) to display the GUI 170 and receive the user selection 171. As another example, in some implementations the device 102 omits the microphone array 150. To illustrate, the device 102 may correspond to a playback device that receives the 3D sound data 126 from an external device (e.g., via wireless transmission), or may correspond to an audio encoding device that wirelessly receives a representation of the audio input signals 160 from an external microphone array (e.g., a head-mounted array, such as in a virtual reality headset implementation). As another example, in some implementations the device 102 omits the loudspeaker array 130. To illustrate, the device 102 may correspond to an audio capture device that generates the 3D sound data 126 and transmits (e.g., via a wireline or wireless transmission) the 3D sound data 126 to an external device for playback, or may correspond to an audio decod- ing device that transmits a representation of the audio output signals 135-138 to an external loudspeaker array (e.g., a speaker bar or other surround-sound system).

FIG. 2A depicts an illustrative example of the GUI 170 including a representation of the device 102 and selectable region indicators 220-228 that can be selected by the user as the user selection 171, such as via interaction with a touch- screen of the display device 166. For example, the user may select one or more of a top region corresponding to a top region indicator 220, a bottom region corresponding to a bottom region indicator 222, a front horizontal region cor- responding to a front horizontal region indicator 226, or a rear horizontal region corresponding to a rear horizontal region indicator 228 for enhanced 3D audio resolution as compared to non-selected regions.

In implementations in which the GUI 170 is provided during audio capture, selection of one or more of the regions indicators 220-228 can cause the filter selector 120 to select the particular filter 116 based on the orientation of the microphone array 150 and further based on the selected region(s). For example, rather than including a single audio capture filter for each orientation 190-193, the device 102 can include multiple audio capture filters for each of the orientations 190-193. To illustrate, the filters 114 may include four audio capture filters that correspond to the second orientation 191: a first filter that is tuned to provide enhanced resolution for sounds from the top region, a second filter that is tuned to provide enhanced resolution for sounds from the bottom region, a third filter that is tuned to provide enhanced resolution for sounds from the front horizontal region, and a fourth filter that is tuned to provide enhanced resolution for sounds from the rear horizontal region. In other implementations, additional audio capture filters may be included that are tuned for various combinations of selected regions (e.g., the top region and the rear horizontal region, the front horizontal region and the rear horizontal region, etc.), or combinations of selected regions can be accommodated via combining multiple single-region filters (e.g., via weighted sums or interpolation of filters).

In implementations in which the GUI 170 is provided during audio playback, selection of one or more of the region indicators 220-228 can cause the filter selector 120 to select the particular filter 116 based on the orientation of the loudspeaker array 130 and further based on the selected region(s). For example, rather than including a single play- back filter for each orientation 194-197, the device 102 can include multiple playback filters for each of the orientations 194-197. To illustrate, the filters 114 may include four playback filters that correspond to the second orientation 191: a first filter that is tuned to provide enhanced resolution for sounds from the top region, a second filter that is tuned to provide enhanced resolution for sounds from the bottom region, a third filter that is tuned to provide enhanced resolution for sounds from the front horizontal region, and a fourth filter that is tuned to provide enhanced resolution for sounds from the rear horizontal region. Additional playback filters may be included, or combinations of playback filters may be used, to accommodate selection of multiple regions, in a manner similar to the audio capture filters described above.

FIG. 2B depicts another illustrative example of the GUI 170 that includes a representation of the device 102 and includes selectable direction indicators 202-212 (e.g., arrows displayed on the display device 166) that can be selected by the user as the user selection 171, such as via interaction with a touchscreen of the display device 166. For example, the user may select the indicators 206 and 208 to designate directions corresponding to the left and right of the device 102, respectively, for enhanced 3D audio resolution, as compared to directions corresponding to the top and bottom of the device (corresponding to indicators 202 and 204, respectively) or directions corresponding to the front and back of the device 102 (corresponding to the indicators 212 and 210, respectively). In a similar manner as described with reference to FIG. 2A, the GUI 170 can be provided during audio capture, during playback, or both, and additional filters for each of the orientations can be included in the filters 114 to provide enhanced audio resolution corresponding to the directions associated with the selectable direction indicators 202-212. Such filters may be combined to accommodate selection of multiple directions, or the filters 114 may also include filters tuned for multiple directions.

FIG. 2C depicts another illustrative example of the GUI 170 that may include text 254 instructing a user to use a "swipe" gesture at a touchscreen of the display device 166 to select a direction for enhanced resolution. In some implementations, a horizontal swipe gesture, depicted as a dashed arrow 250, indicates user selection of enhanced resolution in all horizontal directions and a vertical swipe gesture, depicted as a dashed arrow 252, indicates user selection of enhanced resolution in both vertical directions. In other implementations, different types of swipe gestures provide additional direction selection capability. In a non-limiting example, a left-to-right swipe indicates a selection of a right direction, a right-to-left swipe indicates a selection of a left direction, a back-and-forth (e.g., left-right-left or right-left-right) horizontal swipe indicates all horizontal directions. Additional gestures may be supported, such as diagonal swipes to indicate diagonal directions, or taps (e.g., two taps indicates a direction corresponding to the field of view of a rear-facing camera of the device 102, three taps indicates a direction corresponding to a field of view of a front-facing camera of the device 102), as illustrative, non-limiting examples.

Figure 3:
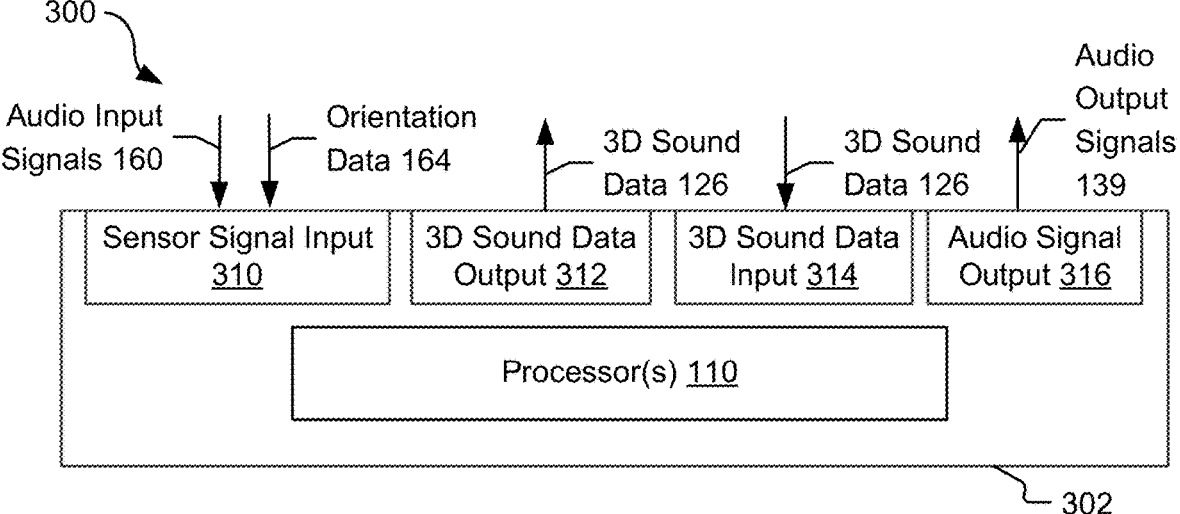
FIG. 3 illustrates an example of an integrated circuit configured to perform orientation-based signal processing operations associated with 3D sound data.
Figure 7:
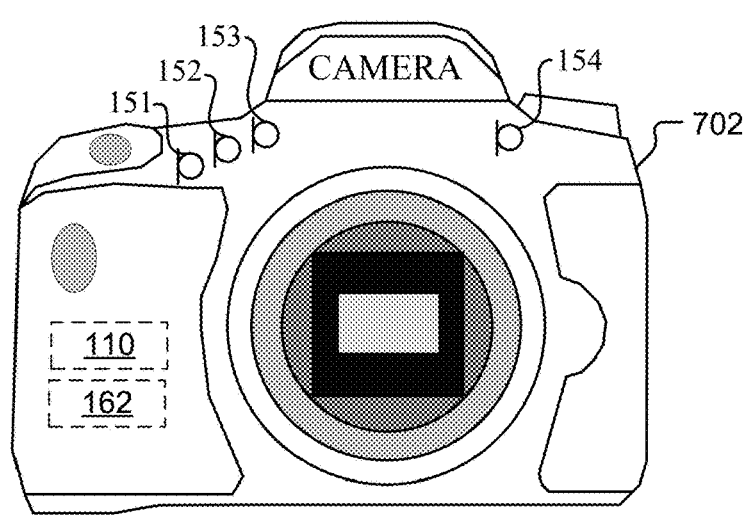
FIG. 7 is a diagram of a camera device operable to perform orientation-based signal processing operations associated with 3D sound data.
Figure 8A:
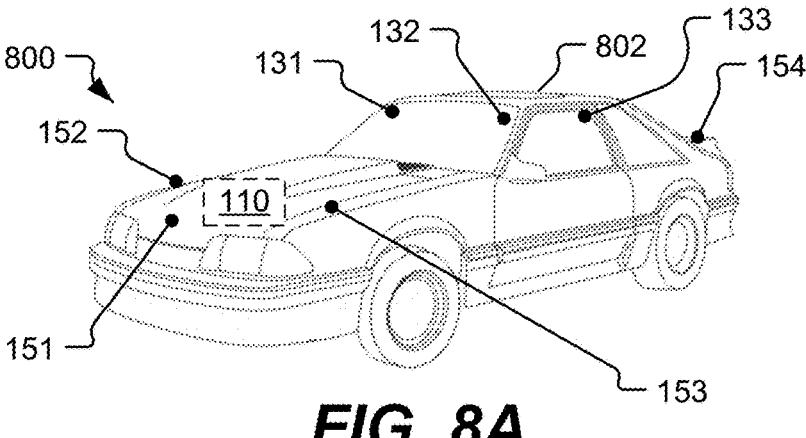
FIG. 8A is a diagram of a first example of a vehicle operable perform orientation-based signal processing operations associated with 3D sound data.
Figure 8B:
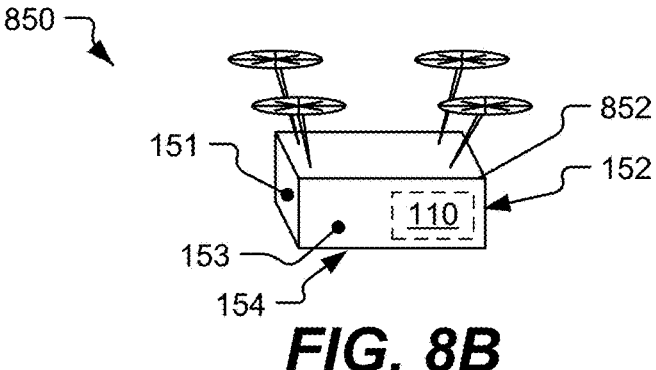
FIG. 8B is a diagram of a second example of a vehicle operable to perform orientation-based signal processing operations associated with 3D sound data.
Figure 10:
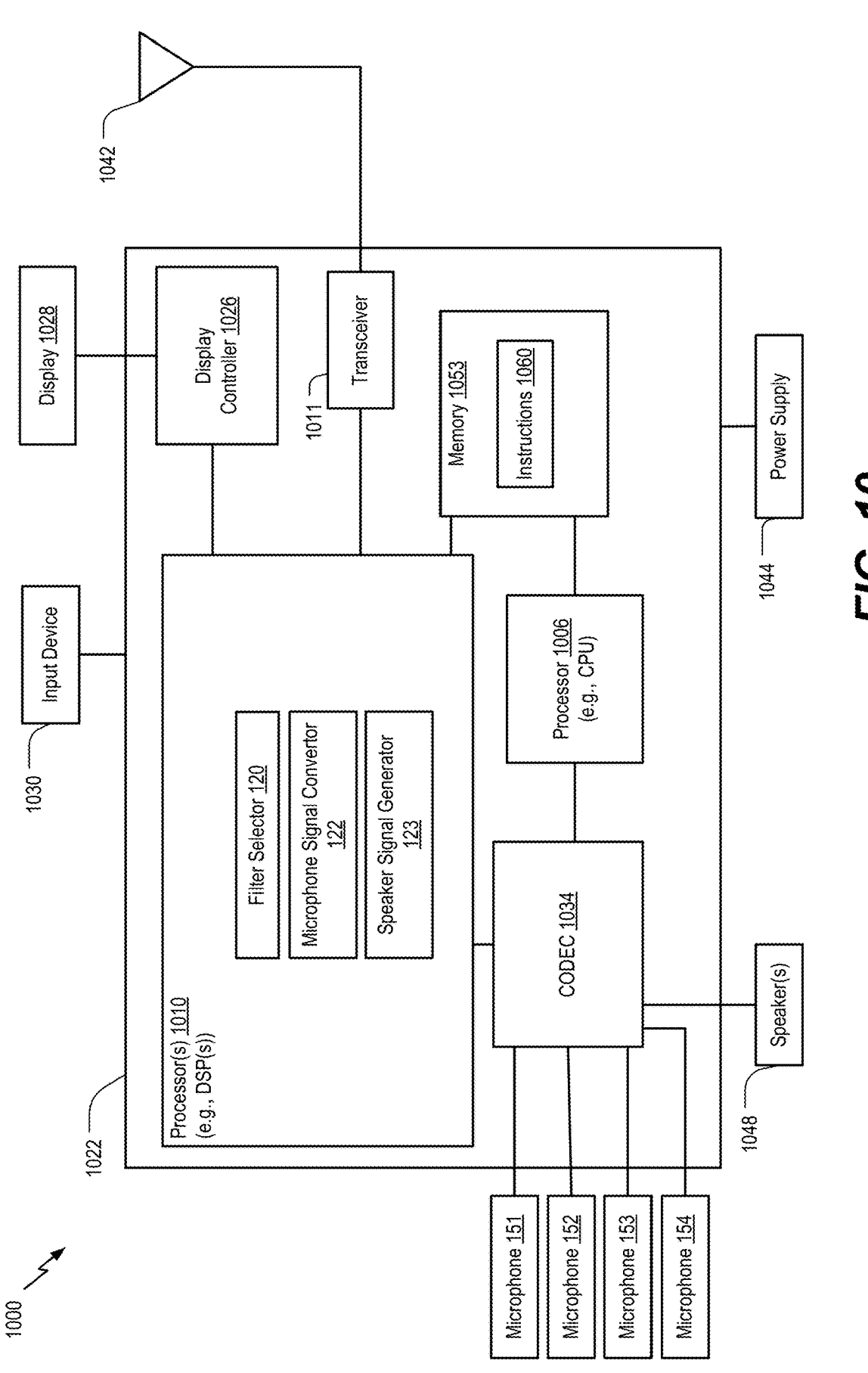
FIG. 10 is a block diagram of a particular illustrative example of a mobile device that is operable to perform the techniques described with reference to FIGS. 1-9.

FIG. 3 depicts an implementation 300 of the device 102 as an integrated circuit 302 that includes the one or more processors 110. The integrated circuit 302 also includes a sensor signal input 310, such as one or more first bus interfaces, to enable the audio input signals 160 to be received from the microphone array 150 and the orientation data 164 to be received from one or more sensors external to the integrated circuit 302. The integrated circuit 302 also includes a 3D sound data output 312, such as a second bus interface, to enable sending of the 3D sound data 126 (e.g., to a playback device, a memory, or a transmitter, as illustrative, non-limiting examples), a 3D sound data input 314, such as a third bus interface, to enable receiving the 3D sound data 126 (e.g., from an audio recording device, a memory, or a receiver, as illustrative, non-limiting examples), and an audio signal output 316, such as fourth bus interface, to enable outputting the audio output signals 139 (e.g., to a speaker array). The integrated circuit 302 enables implementation of orientation-based 3D sound encoding and playback as a component in a system that includes one or more orientation sensors, a microphone array, a loudspeaker array, or a combination thereof, such as in a mobile phone or tablet computer device as depicted in FIG. 4, a virtual reality or augmented reality headset as depicted in FIG. 5, a wearable electronic device as depicted in FIG. 6, a camera device as depicted in FIG. 7, a vehicle as depicted in FIG. 8A or 8B, or a wireless communication device as depicted in FIG. 10.

Figure 4:
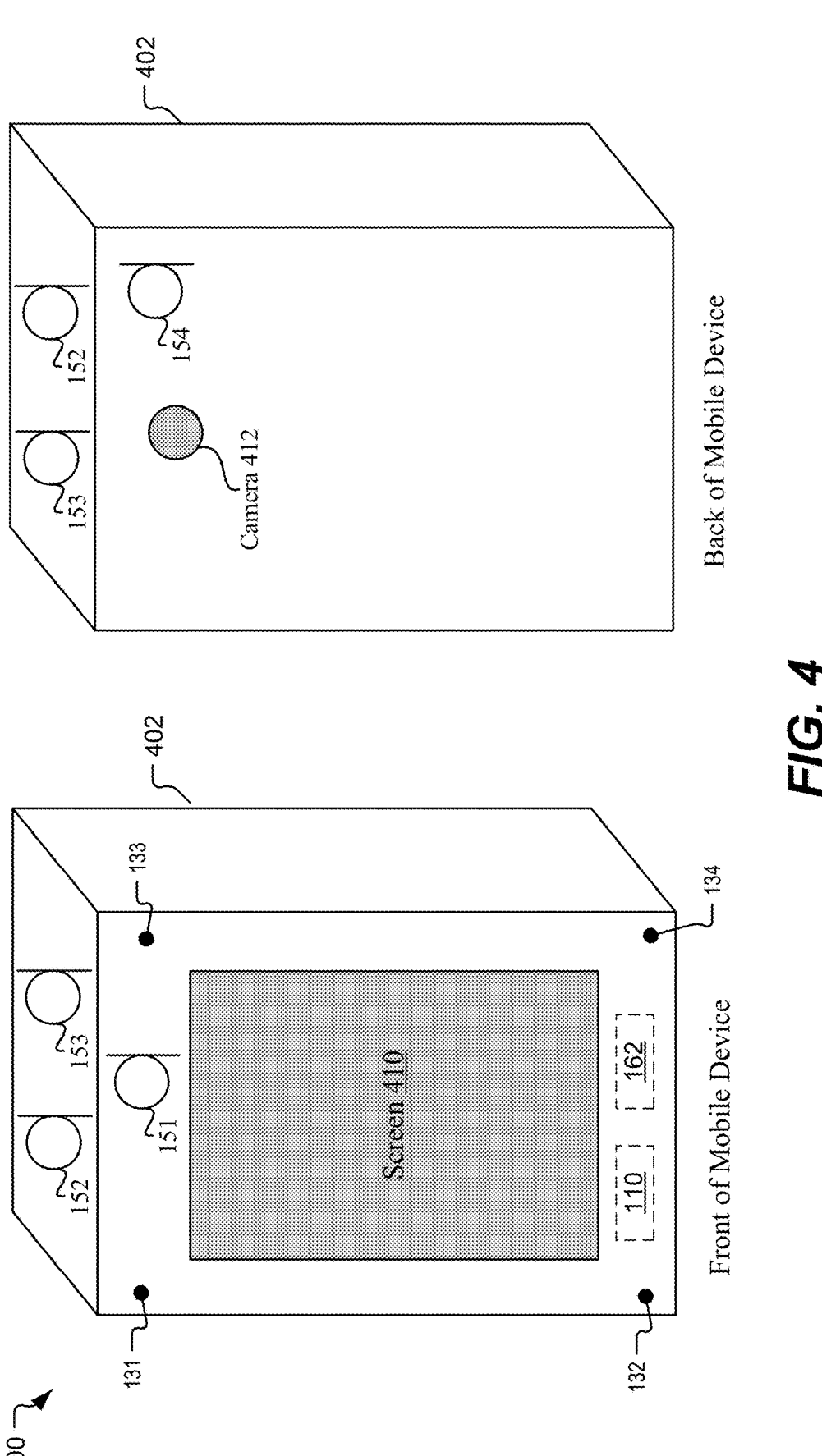
FIG. 4 illustrates an illustrative implementation of a tablet computer device operable to perform orientation-based signal processing operations associated with 3D sound data.

FIG. 4 depicts an implementation 400 in which the device 102 is a portable electronic device that corresponds to a tablet computer device 402. The one or more processors 110 and the orientation sensor 162 are illustrated in dashed lines that indicate that these components are internal to (e.g., enclosed within a housing of) the tablet computer device 402. The first microphone 151 is located above a screen 410 (e.g., the display device 166) on a front face of the tablet computer device 402, the second microphone 152 and the third microphone 153 are located at a top edge of the tablet computer device 402, and the fourth microphone 154 is located on a back face of the tablet computer device 402 proximate to a rear-facing camera 412. The loudspeakers 131-134 are arranged on a front face of the tablet computer device 402. In FIG. 4, as well as the other implementations depicted in FIGS. 5-8, the number, locations, and orientations of the microphones and the loudspeakers are depicted for illustrative purposes only, and it should be understood that any other numbers, locations, and orientations of microphones and loudspeakers can be used.

Figure 5:
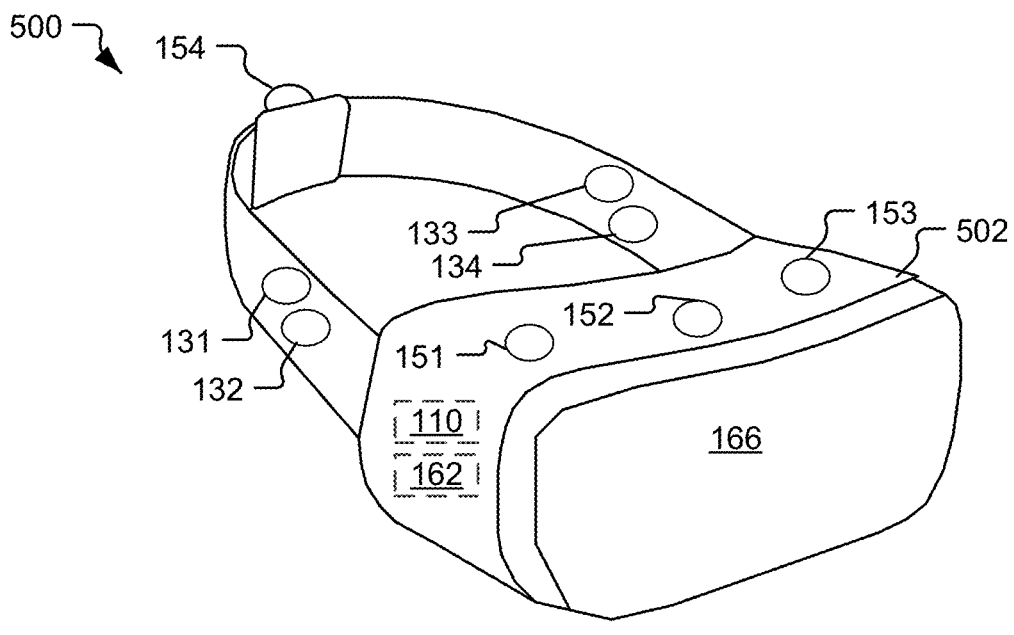
FIG. 5 is a diagram of a virtual reality or augmented reality headset operable to perform orientation-based signal processing operations associated with 3D sound data.

FIG. 5 depicts an implementation 500 in which the device 102 is a portable electronic device that corresponds to a virtual reality, augmented reality, or mixed reality headset 502. The one or more processors 110, the orientation sensor 162, the microphones 151-154, and the loudspeakers 131-134 are integrated into the headset 502. A visual interface device, such as the display device 166, is positioned in front of the user's eyes to enable display of augmented reality or virtual reality images or scenes to the user while the headset 502 is worn. In a particular example, the display device 166 is configured to display the GUI 170.

Figure 6:
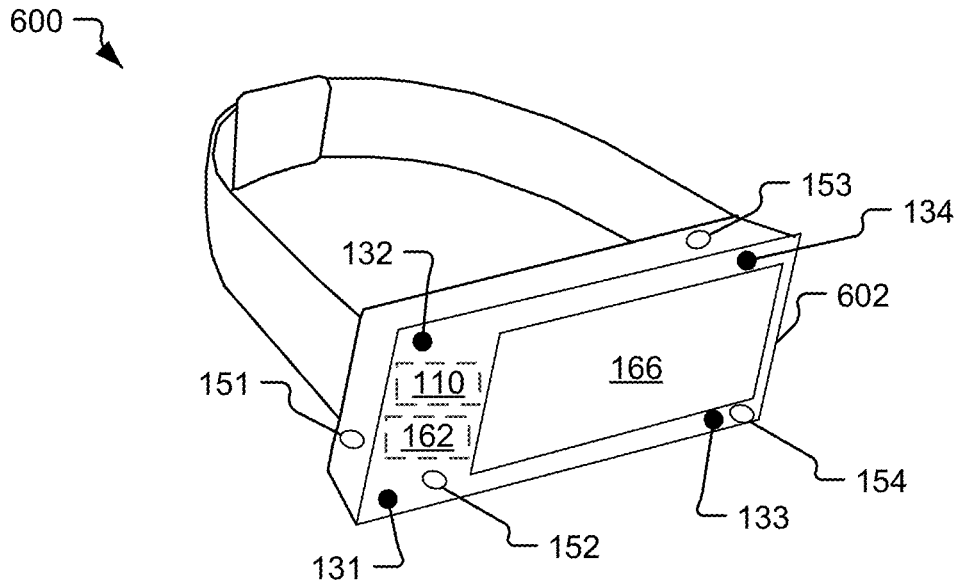
FIG. 6 is a diagram of a wearable electronic device operable to perform orientation-based signal processing operations associated with 3D sound data.

FIG. 6 depicts an implementation 600 in which the device 102 is a portable electronic device that corresponds to a wearable electronic device 602, illustrated as a "smart watch." The one or more processors 110, the orientation sensor 162, the microphones 151-154, and the loudspeakers 131-134 are integrated into the wearable electronic device 602.

FIG. 7 depicts an implementation 700 in which the device 102 is a portable electronic device that corresponds to a camera device 702. The one or more processors 110, the orientation sensor 162, and the microphones 151-154 are integrated into the camera device 702. Although not illustrated, in other implementations the camera device 702 includes one or more of the loudspeakers 131-134 for 3D audio playback.

FIG. 8A depicts an implementation 800 in which the device 102 corresponds to, or is integrated within, a vehicle 802, illustrated as a car. In some implementations, 3D sound capture adjustment (e.g., sound direction adjustment, directional sound enhancement, or both) can be performed based on the orientation of the vehicle 802 in conjunction with movement and orientation of the vehicle 802 to assist an operator of the vehicle 802 via playback, within the vehicle 802, of the sound field external to the vehicle 802. For example, filter selection may be performed to capture (and playback) higher resolution sound from the front of the vehicle 802 while the vehicle 802 is moving forward, from the rear of the vehicle 802 while the vehicle 802 is moving backward, from the right side of the vehicle 802 while the vehicle 802 is engaged in a right-hand turn, or from the left side of the vehicle 802 while the vehicle 802 is engaged in a left-hand turn, as illustrative, non-limiting examples. Alternatively, or in addition, in some implementations 3D sound capture adjustment (e.g., sound direction adjustment, directional sound enhancement, or both) can be performed based on the orientation of the vehicle 802 in conjunction with an orientation of the vehicle 802 to capture the 3D sound scene around the vehicle 802 for later playback, such as in a vehicle used by law enforcement or security personnel, in a vehicle operated by tourists or vacationers to chronicle a driving trip, or in a vehicle that includes a sensor recording device (e.g., a "black box") to preserve evidence in the event of a collision, as illustrative, non-limiting examples.

FIG. 8B depicts another implementation 850 in which the device 102 corresponds to or is integrated within a vehicle 852, illustrated as a manned or unmanned aerial device (e.g., a package delivery drone). Sound field enhancement can be performed based on the orientation of the vehicle 802 in conjunction with movement of the vehicle 802, such as during a banking turn, dive, or climb, to provide enhanced sound field data to an operator of the vehicle 852 in directions of interest. Other examples include selection of a sound field enhancement direction based on an operating mode of the vehicle 852, such as to provide enhanced resolution in horizontal directions during level flight (for enhanced aural detection of other flight traffic in the vicinity of the vehicle 852), and to switch to providing enhanced resolution in the downward direction when the vehicle 852 is engaged in landing or dropping off a package at a destination, as illustrative, non-limiting examples. Although not illustrated, in other implementations the vehicle 852 includes one or more of the loudspeakers 131-134 for 3D audio playback.

Figure 9:
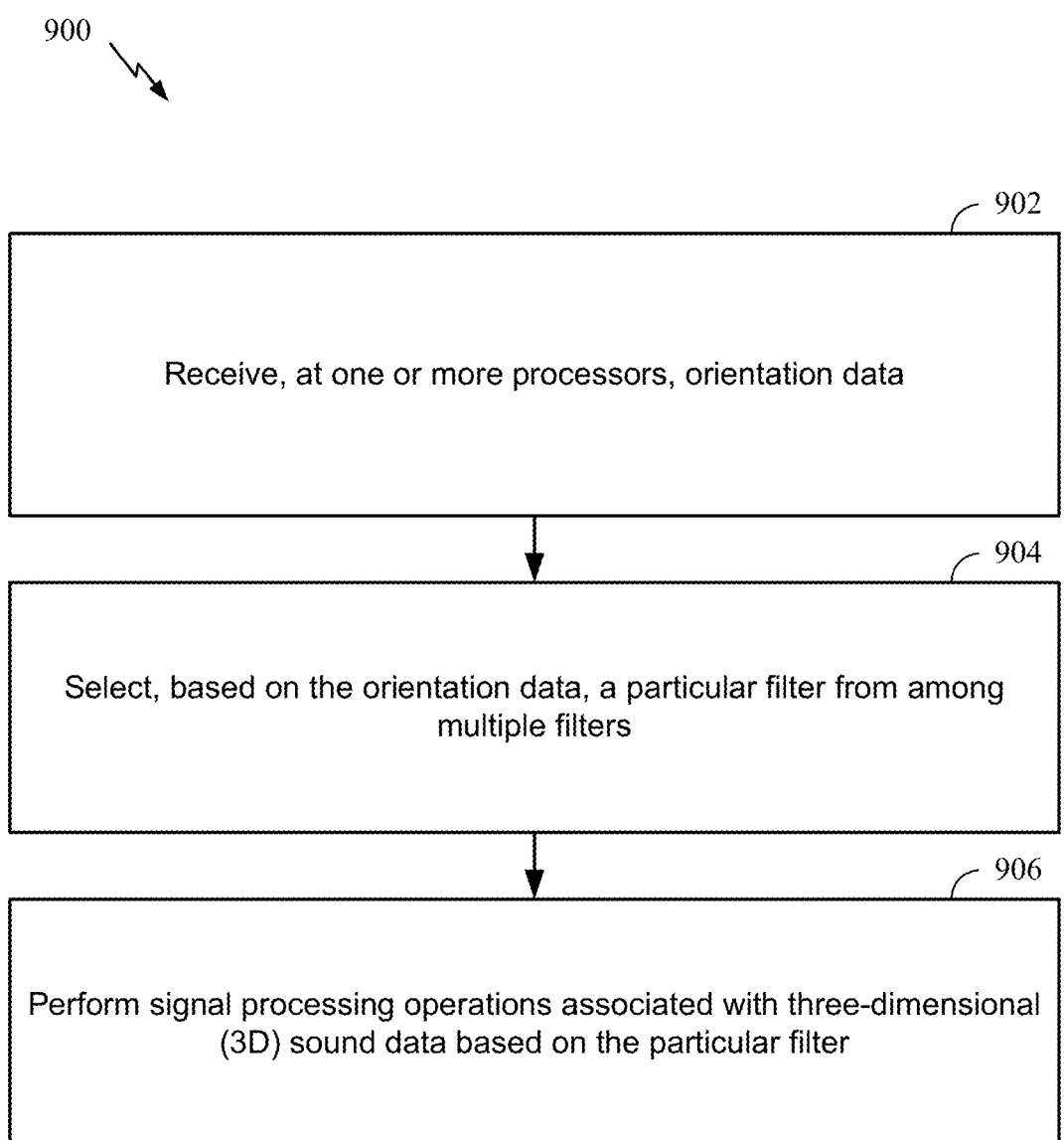
FIG. 9 illustrates an example of a method for performing orientation-based signal processing associated with 3D sound data.

Referring to FIG. 9, a method 900 for orientation-based 3D sound data generation is shown. For example, the method 900 may be performed by the device 102 of FIG. 1, the one or more processors 110 of FIG. 1, or the integrated circuit 302 of FIG. 3, as illustrative, non-limiting examples.

The method 900 includes, at 902, receiving, at one or more processors, orientation data. In some implementations, the orientation data indicates an orientation of a microphone array. For example, the processor 110 may receive the orientation data 164 indicating an orientation of the microphone array 150. In some implementations, the orientation data indicates an orientation of a speaker array. For example, the processor 110 may receive the orientation data 164 indicating an orientation of the speaker array 130.

The method 900 includes, at 904, selecting, based on the orientation data, a particular filter from among multiple filters. For example, the filter selector 120 selects the particular filter 116 from among the multiple filters 114 based on the orientation data 164.

The method 900 includes, at 906, performing signal processing operations associated with 3D sound data based on the particular filter. For example, the one or more processors 110 perform the signal processing operations 124 on the audio input signals 160 captured by the microphones 151-154 to generate the 3D sound data 126 based on the audio input signals 160 and further based on the particular filter 116. As another example, the one or more processors 110 perform the signal processing operations 124 during processing of the 3D sound data 126 to generate the audio output signals 139 for playback via the loudspeakers 131-134. In some implementations, the 3D sound field data includes at least one of the ambisonic data 127 or the object audio data 129.

In some implementations, the orientation data indicates an orientation of a microphone array, the signal processing operations are configured to generate the 3D sound data based on audio input signals received from the microphone array and further based on the particular filter, the multiple filters include a first filter configured to apply, in the 3D sound data, a first rotation corresponding to a first orientation of the microphone array, and the multiple filters include a second filter configured to apply, in the 3D sound data, a second rotation corresponding to a second orientation of the microphone array. For example, in some implementations, the orientation data 164 indicates an orientation of the microphone array 150, the signal processing operations 124 are configured to generate the 3D sound data 126 based on the audio input signals 160 received from the microphone array 150 and further based on the particular filter 116, the multiple filters 114 include a first filter 180 configured to apply, in the 3D sound data 126, a first rotation corresponding to a first orientation 190 of the microphone array 150, and the multiple filters 114 include a second filter 181 configured to apply, in the 3D sound data 126, a second rotation corresponding to a second orientation 191 of the microphone array 150. In an example, the first orientation 190 corresponds to one of a landscape mode 140 of a portable electronic device that includes the one or more processors 110 and the microphone array 150, a portrait mode 142 of the portable electronic device, a face-up mode 144 of the portable electronic device, or a face-down mode 146 of the portable electronic device, and the second orientation corresponds to another of the landscape mode 140, the portrait mode 142, the face-up mode 144, or the face-down mode 146.

In some implementations, a first filter of the multiple filters is configured to provide higher resolution of a 3D sound field in a horizontal direction than in a vertical direction when the microphone array has a first orientation, and a second filter of the multiple filters is configured to provide higher resolution of the 3D sound field in the horizontal direction than in the vertical direction when the microphone array has a second orientation.

In some implementations, the orientation data indicates an orientation of a loudspeaker array, the signal processing operations are configured to generate audio output signals for playback at the loudspeaker array based on the 3D sound data and further based on the particular filter, and the multiple filters include a first filter associated with a first orientation of the loudspeaker array and a second filter associated with a second orientation of the loudspeaker array. In an illustrative example, the orientation data 164 indicates an orientation of the loudspeaker array 130, the signal processing operations 124 are configured to generate the audio output signals 139 for playback at the loudspeaker array 130 based on the 3D sound data 126 and further based on the particular filter 116, and the multiple filters 114 include a first filter 184 associated with a first orientation 194 of the loudspeaker array 130 and a second filter 185 associated with a second orientation 195 of the loudspeaker array 130. In some implementations, the first filter 184 is configured to apply, to the 3D sound data 126, a first rotation corresponding to the first orientation 194, and the second filter 185 is configured to apply, to the 3D sound data 126, a second rotation corresponding to the second orientation 195. In an example, the loudspeaker array 130 and the one or more processors 110 are integrated in a portable electronic device, the first orientation 194 corresponds to one of a landscape mode 140 of the portable electronic device, a portrait mode 142 of the portable electronic device, a face-up mode 144 of the portable electronic device, or a face-down mode 146 of the portable electronic device, and the second orientation 195 corresponds to another of the landscape mode 140, the portrait mode 142, the face-up mode 144, or the face-down mode 146.

In some implementations, the method 900 also includes determining that an orientation indicated by the orientation data more closely matches a particular orientation associated with the particular filter than any other orientation associated with the multiple filters, and the particular filter is selected in response to the determination. In other implementations, the method 900 includes selecting a second particular filter based on the orientation data and performing the signal processing operations further based on an interpolation between the particular filter and the second particular filter or based on a combination of the particular filter and the second particular filter.

In some implementations, the method 900 includes displaying a graphical user interface that enables user selection of one or more sound scene directions, such as the GUI 170. The method 900 may also include receiving the user selection, such as the user selection 171, and the particular filter is selected further based on the user selection.

Referring to FIG. 10, a block diagram of a particular illustrative implementation of a device (e.g., a wireless communication device) is depicted and generally designated 1000. In various implementations, the device 1000 may have more components or fewer components than illustrated in FIG. 10.

In a particular implementation, the device 1000 includes a processor 1006, such as a central processing unit (CPU) or a digital signal processor (DSP), coupled to a memory 1053 (e.g., the memory 112). The memory 1053 includes instructions 1060 (e.g., executable instructions) such as computer-readable instructions or processor-readable instructions. The instructions 1060 may include one or more instructions that are executable by a computer, such as the processor 1006 or a processor 1010. Although the processor 1010 is illustrated as including the filter selector 120, the microphone signal convertor 122, and the speaker signal generator 123, in other implementations one or more, or all, of the filter selector 120, the microphone signal convertor 122, or the speaker signal generator 123 can be implemented at the processor 1006, at a CODEC 1034, or at one or more other components of the device 1000.

FIG. 10 also illustrates a display controller 1026 that is coupled to the processor 1010 and to a display 1028 (e.g., the display device 166). A coder/decoder (CODEC) 1034 may also be coupled to the processor 1006. Multiple loudspeakers 1048 (e.g., the loudspeakers 131-134) and the microphones 151-154 may be coupled to the CODEC 1034. In some implementations, the multiple loudspeakers 1048 are configured to play out audio data corresponding to the 3D sound data 126.

A transceiver 1011 may be coupled to the processor 1010 and to an antenna 1042, such that wireless data received via the antenna 1042 and the transceiver 1011 may be provided to the processor 1010. In some implementations, the antenna 1042 is configured to transmit the 3D sound data 126 or to receive the 3D sound data 126, such as during communication with an external device via a wireless network.

In some implementations, the processor 1010, the display controller 1026, the memory 1053, the CODEC 1034, and the transceiver 1011 are included in a system-in-package or system-on-chip device 1022. In some implementations, an input device 1030 and a power supply 1044 are coupled to the system-on-chip device 1022. The input device 1030 may include one or more sensors configured to generate the orientation data 164 of FIG. 1. Moreover, in a particular implementation, as illustrated in FIG. 10, the display 1028, the input device 1030, the loudspeakers 1048, the microphones 151-154, the antenna 1042, and the power supply 1044 are external to the system-on-chip device 1022. In a particular implementation, each of the display 1028, the input device 1030, the loudspeakers 1048, the microphones 151-154, the antenna 1042, and the power supply 1044 may be coupled to a component of the system-on-chip device 1022, such as an interface or a controller.

The device 1000 may include a headset, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a component of a vehicle, or any combination thereof, as illustrative, non-limiting examples.

In an illustrative implementation, the memory 1053 may include or correspond to a non-transitory computer readable medium storing the instructions 1060. The instructions 1060 may include one or more instructions that are executable by a computer, such as the processors 1010, 1006 or the CODEC 1034. The instructions 1060 may cause the processor 1010 to perform one or more operations described herein, including but not limited to one or more portions of the method 900 of FIG. 9.

Figure 11:
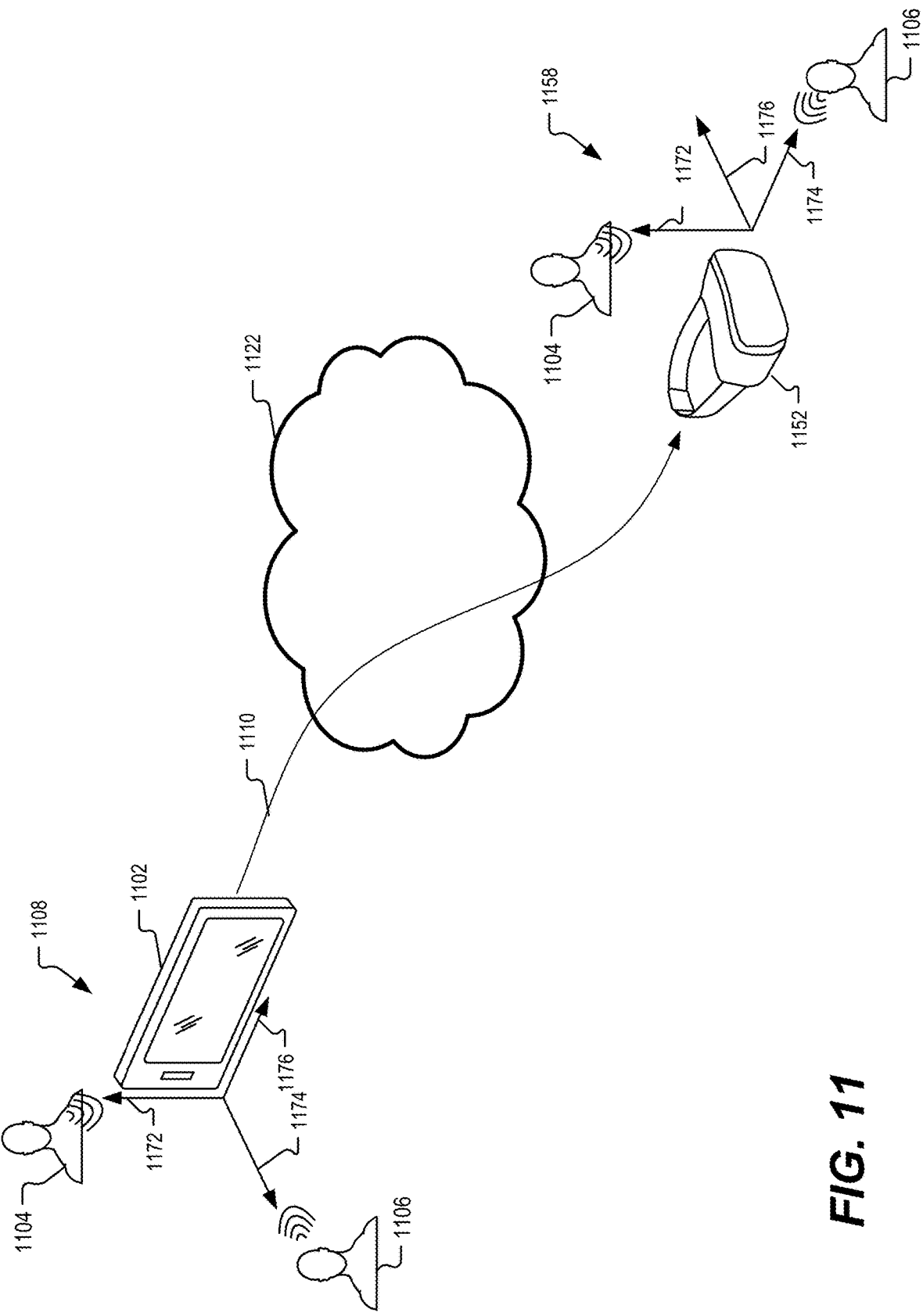
FIG. 11 is a diagram of an example of a system including multiple devices operable to perform orientation-based signal processing operations associated with 3D sound data.

FIG. 11 depicts an example of a system that includes a first device 1102 communicatively coupled to a second device 1152 via a network 1122, such as a wireless network, a wireline network, or a combination thereof.

The first device 1102 is configured to capture a 3D sound scene 1108 that includes—in the illustrated orientation of the first device 1102—first sound from a first sound source 1104 illustrated above the first device 1102 (e.g., in a vertical direction) and a second sound from a second sound source 1106 in front of the first device 1102 (e.g., in a horizontal direction). In particular, the first device 1102 is configured to determine its orientation with reference to a first coordinate (e.g., a first direction) 1172 of the 3D sound scene 1108, a second coordinate (e.g., a second direction) 1174 of the 3D sound scene 1108, and a third coordinate (e.g., a third direction) 1176 of the 3D sound scene 1108. The first device 1102 is configured to select one or more filters for use in converting microphone input signals to 3D sound data, and the first device 1102 is configured to transmit the 3D sound data to the second device 1152 via a bitstream 1110. For example, the first device 1102 may include the filter selector 120, the microphone signal convertor 122, and multiple filters to adjust 3D audio capture and encoding based on the orientation of the first device 1102, such as the audio capture filters 180-183 of FIG. 1.

The first device 1102 is configured to select different audio capture filters in response to detecting changes in orientation while audio capture is ongoing. For example, in response to the first device 1102 detecting an orientation change from a landscape mode to a portrait mode, the first device 1102 may switch from using the first filter 180 to using the second filter 181 while generating the bitstream 1110. In some implementations, the first device 1102 is configured to detect changes in a first angular orientation with reference to the first coordinate 1172 (referred to herein as "yaw"), changes in a second angular orientation with reference to the second coordinate 1174 (referred to herein as "roll"), and changes in a third angular orientation with reference to the third coordinate 1176 (referred to herein as "pitch").

The first device 1102 may include filters associated with 90-degree orientations as described in FIG. 1 (e.g., a changes in orientation of the first device 1102 from the landscape mode to the portrait mode is associated with a 90-degree change in roll, and a change in orientation from the landscape mode to the face-up mode corresponds to a 90-degree change in pitch). In other implementations, the first device 1102 includes filters associated with each combination of angular orientations for every X degrees of yaw, Y degrees of roll, and Z degrees of pitch, where X, Y, and Z are real numbers that may be equal to each other or may differ from each other. Smaller values of X, Y, and Z result in higher angular resolution using increased number of filters, while larger values of X, Y, and Z result in fewer filters and therefore reduced memory or storage usage. The resulting bitstream 1110 represents the 3D sound scene 1108 as remaining substantially stationary, such that the first sound source 1104 remains substantially in the first direction 1172 and the second sound source remains substantially in the second direction 1174 independently of how the orientation of the first device 1102 changes relative to any of the directions 1172-1176 during recording.

The second device 1152 is illustrated as a virtual reality or augmented reality headset that is configured to receive and playback the bitstream 1110 to re-create the 3D sound scene 1108 as a re-created 3D sound scene 1158. The re-created 3D sound scene 1158 provides to a user of the second device 1152—in the illustrated orientation of the second device 1152—the perception of the first sound originating from the first sound source 1104 above the second device 1152 (e.g., in a vertical direction) and the second sound originating from the second sound source 1106 in front of the second device 1152 (e.g., in a horizontal direction). In particular, the second device 1152 is configured to determine its orientation with reference to the first coordinate 1172 of the re-created 3D sound scene 1158, the second coordinate 1174 of the re-created 3D sound scene 1158, and a third coordinate 1176 of the re-created 3D sound scene 1158. The second device 1152 is configured to select one or more filters for use in converting the 3D sound data encoded in the bitstream 1110 to audio output signals for a loudspeaker array. For example, the second device 1152 may include the filter selector 120, the speaker signal generator 123, and multiple filters to adjust 3D audio decoding and playback based on the orientation of the second device 1152, such as the playback filters 184-187 of FIG. 1.

The second device 1152 is configured to select different playback filters in response to detecting changes in orientation while audio playback is ongoing. For example, in response to the second device 1152 detecting an orientation change from a landscape mode (e.g., the user looking straight ahead) to a face-up mode (e.g., the user tilts the user's head upward), the second device 1152 may switch from using the fifth filter 184 to using the seventh filter 186 during playback. In some implementations, the second device 1152 is configured to detect changes in a first angular orientation of the second device 1152 with reference to the first coordinate 1172 ("yaw"), changes in a second angular orientation of the second device 1152 with reference to the second coordinate 1174 ("roll"), and changes in a third angular orientation of the second device 1152 with reference to the third coordinate 1176 ("pitch").

The second device 1152 may include filters associated with 90-degree orientations as described in FIG. 1 (e.g., a changes in orientation of the second device 1152 from the landscape mode (e.g., the user's head in a neutral position) to a portrait mode (e.g., the user's head tilted sideways) is associated with a 90-degree change in roll, and a change in orientation from the landscape mode to the face-up mode (e.g., the user's head tilted upwards) corresponds to a 90-degree change in pitch). In other implementations, the second device 1152 includes filters associated with each combination of angular orientations for every X' degrees of yaw, Y' degrees of roll, and Z' degrees of pitch, where X', Y', and Z' are real numbers that may be equal to each other or may differ from each other. Further, X', Y', and Z' may be equal to or different from the corresponding X, Y, and Z, respectively, used by the first device 1102. Smaller values of X', Y', and Z' result in higher angular resolution using increased number of filters, while larger values of X', Y', and Z' result in fewer filters and therefore reduced memory or storage usage. The resulting re-created sound scene 1158 represents the 3D sound scene 1108 as remaining substantially stationary while the user changes the orientation of the second device 1152, such that the first sound source 1104 remains substantially in the first direction 1172 and the second sound source remains substantially in the second direction 1174 independently of how the orientation of the second device 1152 changes relative to any of the directions 1172-1176 during playback.

In a particular implementation, one or more components of the systems and devices disclosed herein may be integrated into a decoding system or apparatus (e.g., an electronic device, a CODEC, or a processor therein), into an encoding system or apparatus, or both. In other implementations, one or more components of the systems and devices disclosed herein may be integrated into a wireless telephone, a tablet computer, a desktop computer, a laptop computer, a set top box, a music player, a video player, an entertainment unit, a television, a game console, a navigation device, a communication device, a personal digital assistant (PDA), a fixed location data unit, a personal media player, or another type of device.

In conjunction with the described techniques, an apparatus includes means for generating orientation data (e.g., the orientation sensor 162) indicating an orientation of a microphone array. The apparatus includes means for selecting (e.g., the one or more processors 110 executing the filter selector 120), based on the orientation data, a particular filter from among multiple filters. The apparatus includes means for performing (e.g., the one or more processors 110 executing the microphone signal convertor 122, the speaker signal generator 123, or both) signal processing operations associated with 3D sound data based on the particular filter. In some implementations, the apparatus includes means for displaying (e.g., the display device 166) a graphical user interface that enables user selection of one or more sound directions, and the means for selecting is configured to select the particular filter further based on the user selection.

According to another particular implementation of the techniques disclosed herein, a non-transitory computer-readable medium (e.g., the memory 112) includes instructions that, when executed by one or more processors (e.g., the one or more processors 110), cause the one or more processors to receive orientation data and to select, based on the orientation data, a particular filter from among multiple filters. The instructions also cause the one or more processors to perform signal processing operations associated with 3D sound data based on the particular filter.

The foregoing techniques may be performed with respect to any number of different contexts and audio ecosystems. A number of example contexts are described below, although the techniques should be limited to the example contexts. One example audio ecosystem may include audio content, movie studios, music studios, gaming audio studios, channel based audio content, coding engines, game audio stems, game audio coding/rendering engines, and delivery systems.

The movie studios, the music studios, and the gaming audio studios may receive audio content. In some examples, the audio content may represent the output of an acquisition. The movie studios may output channel based audio content (e.g., in 2.0, 5.1, and 7.1) such as by using a digital audio workstation (DAW). The music studios may output channel based audio content (e.g., in 2.0, and 5.1) such as by using a DAW. In either case, the coding engines may receive and encode the channel based audio content based one or more codecs (e.g., AAC, AC3, Dolby True HD, Dolby Digital Plus, and DTS Master Audio) for output by the delivery systems. The gaming audio studios may output one or more game audio stems, such as by using a DAW. The game audio coding/rendering engines may code and or render the audio stems into channel based audio content for output by the delivery systems. Another example context in which the techniques may be performed includes an audio ecosystem that may include broadcast recording audio objects, professional audio systems, consumer on-device capture, ambisonic audio format, on-device rendering, consumer audio, TV, and accessories, and car audio systems.

The broadcast recording audio objects, the professional audio systems, and the consumer on-device capture may all code their output using ambisonic audio format. In this way, the audio content may be coded using the ambisonic audio format into a single representation that may be played back using the on-device rendering, the consumer audio, TV, and accessories, and the car audio systems. In other words, the single representation of the audio content may be played back at a generic audio playback system (i.e., as opposed to requiring a particular configuration such as 5.1, 7.1, etc.).

Other examples of context in which the techniques may be performed include an audio ecosystem that may include acquisition elements, and playback elements. The acquisition elements may include wired and/or wireless acquisition devices (e.g., Eigen microphones), on-device surround sound capture, and mobile devices (e.g., smartphones and tablets). In some examples, wired and/or wireless acquisition devices may be coupled to mobile device via wired and/or wireless communication channel(s).

In accordance with one or more techniques of this disclosure, the mobile device may be used to acquire a sound field. For instance, the mobile device may acquire a sound field via the wired and/or wireless acquisition devices and/or the on-device surround sound capture (e.g., a plurality of microphones integrated into the mobile device). The mobile device may then code the acquired sound field into the ambisonic audio data for playback by one or more of the playback elements. For instance, a user of the mobile device may record (acquire a sound field of) a live event (e.g., a meeting, a conference, a play, a concert, etc.), and code the recording into ambisonic audio data.

The mobile device may also utilize one or more of the playback elements to playback the ambisonic coded sound field. For instance, the mobile device may decode the ambisonic coded sound field and output a signal to one or more of the playback elements that causes the one or more of the playback elements to recreate the sound field. As one example, the mobile device may utilize the wireless and/or wireless communication channels to output the signal to one or more speakers (e.g., speaker arrays, sound bars, etc.). As another example, the mobile device may utilize docking solutions to output the signal to one or more docking stations and/or one or more docked speakers (e.g., sound systems in smart cars and/or homes). As another example, the mobile device may utilize headphone rendering to output the signal to a set of headphones, e.g., to create realistic binaural sound.

In some examples, a particular mobile device may both acquire a 3D sound field and playback the same 3D sound field at a later time. In some examples, the mobile device may acquire a 3D sound field, encode the 3D sound field into ambisonic audio data, and transmit the encoded 3D sound field to one or more other devices (e.g., other mobile devices and/or other non-mobile devices) for playback.

Yet another context in which the techniques may be performed includes an audio ecosystem that may include audio content, game studios, coded audio content, rendering engines, and delivery systems. In some examples, the game studios may include one or more DAWs which may support editing of ambisonic audio signals. For instance, the one or more DAWs may include ambisonic audio data plugins and/or tools which may be configured to operate with (e.g., work with) one or more game audio systems. In some examples, the game studios may output new stem formats that support ambisonic audio data. In any case, the game studios may output coded audio content to the rendering engines which may render a sound field for playback by the delivery systems.

The techniques may also be performed with respect to exemplary audio acquisition devices. For example, the techniques may be performed with respect to an Eigen microphone which may include a plurality of microphones that are collectively configured to record a 3D sound field. In some examples, the plurality of microphones of Eigen microphone may be located on the surface of a substantially spherical ball with a radius of approximately 4 cm.

Another exemplary audio acquisition context may include a production truck which may be configured to receive a signal from one or more microphones, such as one or more Eigen microphones. The production truck may also include an audio encoder.

The mobile device may also, in some instances, include a plurality of microphones that are collectively configured to record a 3D sound field. In other words, the plurality of microphone may have X, Y, Z diversity. In some examples, the mobile device may include a microphone which may be rotated to provide X, Y, Z diversity with respect to one or more other microphones of the mobile device. The mobile device may also include an audio encoder.

Example audio playback devices that may perform various aspects of the techniques described in this disclosure are further discussed below. In accordance with one or more techniques of this disclosure, speakers and/or sound bars may be arranged in any arbitrary configuration while still playing back a 3D sound field. Moreover, in some examples, headphone playback devices may be coupled to a decoder via either a wired or a wireless connection. In accordance with one or more techniques of this disclosure, a single generic representation of a sound field may be utilized to render the sound field on any combination of the speakers, the sound bars, and the headphone playback devices.

A number of different example audio playback environments may also be suitable for performing various aspects of the techniques described in this disclosure. For instance, a 5.1 speaker playback environment, a 2.0 (e.g., stereo) speaker playback environment, a 9.1 speaker playback environment with full height front loudspeakers, a 22.2 speaker playback environment, a 16.0 speaker playback environment, an automotive speaker playback environment, and a mobile device with ear bud playback environment may be suitable environments for performing various aspects of the techniques described in this disclosure.

In accordance with one or more techniques of this disclosure, a single generic representation of a sound field may be utilized to render the sound field on any of the foregoing playback environments. Additionally, the techniques of this disclosure enable a rendered to render a sound field from a generic representation for playback on the playback environments other than that described above. For instance, if design considerations prohibit proper placement of speakers according to a 7.1 speaker playback environment (e.g., if it is not possible to place a right surround speaker), the techniques of this disclosure enable a render to compensate with the other 6 speakers such that playback may be achieved on a 6.1 speaker playback environment.

Moreover, a user may watch a sports game while wearing headphones. In accordance with one or more techniques of this disclosure, the 3D sound field of the sports game may be acquired (e.g., one or more Eigen microphones may be placed in and/or around the baseball stadium), ambisonic audio data corresponding to the 3D sound field may be obtained and transmitted to a decoder, the decoder may reconstruct the 3D sound field based on the ambisonic audio data and output the reconstructed 3D sound field to a renderer, the renderer may obtain an indication as to the type of playback environment (e.g., headphones), and render the reconstructed 3D sound field into signals that cause the headphones to output a representation of the 3D sound field of the sports game.

It should be noted that various functions performed by the one or more components of the systems and devices disclosed herein are described as being performed by certain components. This division of components is for illustration only. In an alternate implementation, a function performed by a particular component may be divided amongst multiple components. Moreover, in an alternate implementation, two or more components may be integrated into a single component or module. Each component may be implemented using hardware (e.g., a field-programmable gate array (FPGA) device, an application-specific integrated circuit (ASIC), a DSP, a controller, etc.), software (e.g., instructions executable by a processor), or any combination thereof.

Those of skill would further appreciate that the various illustrative logical blocks, configurations, circuits, and algorithm steps described in connection with the implementations disclosed herein may be implemented as electronic hardware, computer software executed by a processing device such as a hardware processor, or combinations of both. Various illustrative components, blocks, configurations, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). An exemplary memory device is coupled to the processor such that the processor can read information from, and write information to, the memory device. In the alternative, the memory device may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. An apparatus comprising:
one or more processors configured to:
   obtain ambisonic data, that represent ambisonic coefficients of an order greater than one, based on an original three-dimensional (3D) sound field;
   obtain orientation data that identifies a particular orientation of a loudspeaker array;
   select, based on the orientation data, a particular filter that substantially matches the particular orientation of the loudspeaker array, from among multiple filters, wherein each of the multiple filters defines a plurality of filter values to be applied to the ambisonic data; and
   perform signal processing operations associated with the original 3D sound field that includes the ambisonic data based on the particular filter, wherein the particular filter is a first filter associated with a first orientation of the loudspeaker array.

2. The apparatus of claim 1, wherein the signal processing operations are configured to generate audio output signals for playback at the loudspeaker array based on the 3D sound field, and wherein the multiple filters include:
   the first filter associated with the first orientation of the loudspeaker array; and
   a second filter associated with a second orientation of the loudspeaker array.

3. The apparatus of claim 2, wherein the first filter is configured to apply, to the 3D sound field, a first rotation corresponding to the first orientation of the loudspeaker array, and wherein the second filter is configured to apply, to the 3D sound field, a second rotation corresponding to the second orientation of the loudspeaker array.

4. The apparatus of claim 2, further comprising a portable electronic device, wherein the loudspeaker array and the one or more processors are integrated in the portable electronic device, wherein the first orientation of the loudspeaker array corresponds to one of a landscape mode of the portable electronic device, a portrait mode of the portable electronic device, a face-up mode of the portable electronic device, or a face-down mode of the portable electronic device, and wherein the second orientation of the loudspeaker array corresponds to another of the landscape mode, the portrait mode, the face-up mode, or the face-down mode.

5. The apparatus of claim 2, wherein the first filter is configured to enhance sounds of the 3D sound field in a first direction that are at a higher sound resolution than in a second direction of the 3D sound field when the loudspeaker array has the first orientation, and wherein the second filter is configured to provide higher sound resolution of the 3D sound field in the first direction than in the second direction of the 3D sound field when the loudspeaker array has the second orientation.

6. The apparatus of claim 1, wherein the orientation data also indicates an orientation of a microphone array during capture of the 3D sound field using the microphone array, and wherein the multiple filters include:

a third filter associated with a first orientation of the microphone array; and a fourth filter associated with a second orientation of the microphone array.

7. The apparatus of claim 6, wherein the third filter is configured to apply, to the 3D sound field, a first rotation corresponding to the first orientation of the microphone array, and wherein the fourth filter is configured to apply, to the 3D sound field, a second rotation corresponding to the second orientation of the microphone array.

8. The apparatus of claim 6, wherein the third filter is configured to enhance sounds of the 3D sound field in a horizontal direction that are at a higher sound resolution than in a vertical direction of the 3D sound field when the microphone array has the first orientation of the microphone array, and wherein the fourth filter is configured to provide higher sound resolution of the 3D sound field in the horizontal direction than in the vertical direction of the 3D sound field when the microphone array has the second orientation of the microphone array.

9. The apparatus of claim 6, further comprising a portable electronic device, wherein the microphone array and the one or more processors are integrated in the portable electronic device, wherein the first orientation of the microphone array corresponds to one of a landscape mode of the portable electronic device, a portrait mode of the portable electronic device, a face-up mode of the portable electronic device, or a face-down mode of the portable electronic device, and wherein the second orientation of the microphone array corresponds to another of the landscape mode, the portrait mode, the face-up mode, or the face-down mode.

10. The apparatus of claim 1, wherein the one or more processors are integrated in one of: a mobile phone, a tablet computer device, a virtual reality headset, an augmented reality headset, a wearable electronic device, a camera device, or a vehicle.

11. The apparatus of claim 1, wherein the one or more processors are further configured to select the particular filter in response to determining that the orientation data corresponds to an orientation that more closely matches a particular orientation associated with the particular filter than any other orientation associated with the multiple filters.

12. The apparatus of claim 1, wherein the one or more processors are further configured to:

select a second particular filter based on the orientation data; and perform the signal processing operations further based on an interpolation between the particular filter and the second particular filter or based on a combination of the particular filter and the second particular filter.

13. The apparatus of claim 1, further comprising a memory that is coupled to the one or more processors and configured to store the multiple filters.

14. The apparatus of claim 1, wherein the one or more processors are further configured to:

generate graphical user interface (GUI) data corresponding to a GUI that enables user selection of one or more sound scene directions; and select the particular filter further based on the user selection.

15. The apparatus of claim 14, further comprising a display device coupled to the one or more processors and configured to display the GUI.

16. The apparatus of claim 1, further comprising one or more sensors configured to generate the orientation data.

17. The apparatus of claim 1, further comprising an array of microphones configured to capture the 3D sound field.

18. The apparatus of claim 1, further comprising an antenna configured to transmit the 3D sound field or to receive the 3D sound field.

19. A method comprising:

obtaining ambisonic data, that represent ambisonic coefficients of an order greater than one, based on an original three-dimensional (3D) sound field;

obtaining orientation data, at one or more processors, wherein the orientation data identifies a particular orientation of a loudspeaker array;

selecting, at the one or more processors and based on the orientation data, a particular filter that substantially matches the particular orientation of the loudspeaker array, from among multiple filters, wherein each of the multiple filters defines a plurality of filter values to be applied to the ambisonic data; and performing signal processing operations associated with the original 3D sound field that includes the ambisonic data based on the particular filter, wherein the particular filter is a first filter associated with a first orientation of the loudspeaker array.

20. A non-transitory computer-readable medium comprising instructions that, when executed by one or more processors, cause the one or more processors to:

obtain ambisonic data, that represent ambisonic coefficients of an order greater than one, based on an original three-dimensional (3D) sound field;

obtain orientation data that identifies a particular orientation of a loudspeaker array;

select, based on the orientation data, a particular filter that substantially matches the particular orientation of the loudspeaker array, from among multiple filters, wherein each of the multiple filters defines a plurality of filter values to be applied to the ambisonic data; and perform signal processing operations associated with the original 3D sound field that includes the ambisonic data based on the particular filter, wherein the particular filter is a first filter associated with a first orientation of the loudspeaker array.

* * * * *